(12) United States Patent
Wang et al.

(10) Patent No.: US 8,254,152 B2
(45) Date of Patent: Aug. 28, 2012

(54) HIGH-VOLTAGE-RESISTANT RECTIFIER WITH STANDARD CMOS TRANSISTORS

(75) Inventors: Jianming Wang, Shanghai (CN); Yusheng Cao, Shanghai (CN); Junhua Mao, Shanghai (CN); Xiangdong Wu, Shanghai (CN)

(73) Assignee: Shanghai Kiloway Electronics Inc, Shanghai (CN)

( * ) Notice: Subject to any disclaimer, the term of this patent is extended or adjusted under 35 U.S.C. 154(b) by 367 days.

(21) Appl. No.: 12/570,160

(22) Filed: Sep. 30, 2009

(65) Prior Publication Data
US 2010/0073979 A1    Mar. 25, 2010

(30) Foreign Application Priority Data
Apr. 2, 2007   (WO) ................ PCT/CN2007/001057

(51) Int. Cl.
*H02M 7/217*    (2006.01)
(52) U.S. Cl. ...................................... 363/127
(58) Field of Classification Search ............ 363/52, 363/81, 84, 125, 127
See application file for complete search history.

(56) References Cited

U.S. PATENT DOCUMENTS

| | | | | |
|---|---|---|---|---|
| 4,069,460 A | * | 1/1978 | Sauer | 330/257 |
| 4,685,048 A | * | 8/1987 | Tazaki | 363/127 |
| 5,412,559 A | * | 5/1995 | Karasawa | 363/127 |
| 6,195,276 B1 | * | 2/2001 | Sebille | 363/127 |
| 6,204,980 B1 | * | 3/2001 | Momtaz et al. | 360/29 |
| 6,256,214 B1 | * | 7/2001 | Farrington et al. | 363/127 |
| 6,307,418 B1 | * | 10/2001 | Dick | 327/303 |
| 6,459,600 B2 | * | 10/2002 | Farrington et al. | 363/89 |

* cited by examiner

*Primary Examiner* — Adolf Berhane
(74) *Attorney, Agent, or Firm* — Ming Chow; Sinorica, LLC

(57) ABSTRACT

A high-voltage-resistant rectifier with standard CMOS transistors is disclosed in present invention. In a bridge full-wave rectifier comprising four MOS transistors, extra transistors are connected in series between the transistors which endure high voltage and the input to decrease the voltage imposed on the gate of them; moreover, the present invention provides a way to divide voltage imposed between the gate and the source of the said transistors by connecting in series with extra transistors, so it is achieved to implement a high-voltage-resistant rectifier with standard low voltage CMOS transistors without additional process complexity, and decreases manufacture and process costs.

9 Claims, 17 Drawing Sheets

HIGH-VOLTAGE-RESISTANT RECTIFIER WITH STANDARD CMOS TRANSISTORS

FIELD OF THE INVENTION

The present invention relates to high-voltage-resistant rectifier, more particularly relates to a high-voltage-resistant rectifier implemented with standard CMOS transistors.

BACKGROUND OF THE INVENTION

A rectifier converts a signal from AC to DC, usually using a bridge full-wave rectifier circuit, as is shown in FIG. 1, which gets input from a power transformer and consists of four rectifying diode D1-D4 and loading resistor $R_L$. The four diodes are in bridge configuration, so it's called bridge rectifier, whose operating principle is shown in FIG. 2a and FIG. 2b. D1, D3 are on and D2, D4 are off at positive cycle of AC signal u, current flows from the top terminal of the secondary coil, through D1→$R_L$→D3, back to the bottom terminal of the secondary coil, one half-wave rectified voltage is achieved on $R_L$, as shown in FIG. 2a. D1, D3 are off and D2, D4 are on at negative cycle of AC signal u, current flows from the bottom terminal of the secondary coil, through D2→$R_L$→D4, then back to the top terminal of the secondary coil, the other half-wave rectified voltage is achieved on $R_L$, as shown in FIG. 2b, hence, a full-wave form is achieved on $R_L$, as is shown in FIG. 3. The two diodes that are connected adversely in series withstand the maximum input voltage.

As is shown in FIG. 4, which is a bridge full-wave rectifier circuit that is usually implemented in integrated circuit. It uses 4 MOS transistors T1-T4 to replace the 4 diodes. The gate and drain of T3 and T4 are shorted to form a MOS diode. The operating principle of the rectifier is shown in the following, diode T3, transistor T2 are on and diode T4, transistor T1 are off at positive half cycle of AC signal u, current flows from one terminal of AC signal, S1, through T3→$R_L$→ground→the source and the drain of T2, back to the other terminal of AC signal, S2, one half-wave rectified voltage is achieved on $R_L$, as is shown in FIG. 5a. Diode T3, transistor T2 are off and diode T2, transistor T1 are on at negative half cycle of AC signal u, current flows from S2, through T4→$R_L$→ground→the source and drain of T1, back to S1, the other half-wave rectified voltage is achieved on $R_L$, as is shown in FIG. 5b. Hence, a full-wave form is achieved on $R_L$. The maximum input voltage is imposed on a reverse MOS diode and on the gate of an off-state MOS transistor in the rectifier.

It usually takes low-voltage logic transistors in standard logic CMOS process, the gate oxide of these transistors has two types, one is ultra-thin oxide for core cell, for instance, about 50 angstroms thickness in 0.25 um process, about 30 angstroms thickness in 0.18 um process and about 20 angstroms thickness in 0.13 um process; the other is thick oxide for input/output (I/O) cell, for instance, about 70 angstroms thickness in 3.3v I/O process and about 50 angstroms thickness in 2.5V I/O process.

For example, the thin gate oxide thickness is about 30 angstroms for core cell which use 1.8v process and the thick gate oxide thickness is about 70 angstroms for I/O cell which use 3.3v process in 0.18 um standard logic CMOS process. The voltage resistant capability depends on the oxide thickness, the lifetime of 70 angstroms oxide is 2000-3000 hours at 5V, but few seconds at 10V.

The non-volatile memory integrated in an existing RFID electronic tag or smart card is implemented with EEPROM technology, but considering the minimum feature line width of CMOS logic process is more advanced than that of EEPORM process, CMOS logic process costs less than EEPROM process with the same storage density if the RFID electronic tag or smart card chip was manufactured in standard low voltage logic CMOS process. However, a RFID electronic tag or smart card chip gets inputs for its rectifier by coil coupling, the peak-peak voltage of carrier is more than 10V, so it would affect the rectifier lifetime if so high voltage imposed on a transistor implemented in standard logic CMOS process.

At present, four transistors usually use high-voltage-resistant transistors in RFID electronic tag or smart card chip, whose source and drain is doped with same type low-density impurity one more time to improve the gate-source and the gate-drain breakdown voltage of the MOS transistor when a MOS transistor is formed; or use thicker oxide to improve gate breakdown voltage. It needs additional process complexity, and couldn't make use of advanced standard logic CMOS process in which the transistor oxide thickness and minimum feature line width is constantly decreasing (e.g. 0.18 um, 0.13 um, 90 nm, 65 nm, and so on).

SUMMARY OF THE INVENTION

A technical difficulty being resolved by the present invention is to provide a high-voltage-resistant rectifier implemented with standard logic CMOS transistors to achieve the purpose of reducing the manufacture and process costs without any complex process addition.

To resolve the said technical difficulty above, the present invention provides a high-voltage-resistant rectifier implemented with standard CMOS transistors with the basic structure of a bridge full-wave rectifier comprising from a first MOS transistor to a fourth MOS transistor, furthermore:

In the said bridge full-wave rectifier, a sixth MOS transistor or a first capacitor is connected in series between the gate of a third MOS transistor which endures high voltage and a second input terminal of the rectifier to decrease the voltage imposed on the gate of the said third MOS transistor; a seventh MOS transistor is connected in series between the source of the said third MOS transistor and a first input terminal of the said rectifier, and the voltage between the gate and the drain of the said seventh transistor is used to divide the voltage imposed by positive and negative AC input signal between the gate and the source of the said third MOS transistor;

In the said bridge full-wave rectifier, a fifth MOS transistor or a second capacitor is connected in series between the gate of a fourth MOS transistor which endures high voltage and the first input terminal of the rectifier to decrease the voltage imposed on the gate of the said fourth MOS transistor; an eighth MOS transistor is connected in series between the source of the said fourth MOS transistor and the second input terminal of the said rectifier, and the voltage between the source and the drain of the said eighth MOS transistor is used to divide the voltage imposed by positive and negative AC input signal between the gate and the source of the said fourth MOS transistor;

Furthermore, multiple outputs could be achieved by using the said high-voltage-resistant rectifier.

Because of adopting above technical scheme, the present invention achieved good result, which means that multiple extra CMOS transistors are used to decrease the voltage on the gate of the CMOS transistors enduring high voltage in a general transistor bridge full-wave rectifier and divide the voltage between the gate and the source of the said transistor, it is achieved to implement a high-voltage-resistant rectifier with standard low voltage CMOS transistors without additional process complexity, and much manufacture and process cost is saved; the said high-voltage-resistant rectifier in the present invention is applicable to RFID electronic tag or smart card chips, therefore it is easy to integrate a non-volatile memory implemented in standard logic CMOS process into the said RFID electronic tag or smart card chips to reduce the implementing cost of the said RFID electronic tag or smart card chips.

DESCRIPTION OF THE DETAILED EMBODIMENT

The said rectifier uses a bridge full-wave rectifier comprising from a first transistor to a fourth transistor as base structure, in the said bridge full-wave rectifier, a sixth MOS transistor or a first capacitor is connected in series between the gate of the a third MOS transistor which endures high voltage and a second input terminal of the rectifier to decrease the voltage imposed on the gate of the said third MOS transistor; a seventh MOS transistor is connected in series between the source of the said third transistor and a first input terminal of the said rectifier, and the voltage between the source and the drain of the said seventh transistor is used to divide the voltage imposed by positive and negative AC input signal between the gate and the source of the said third transistor; in the said bridge full-wave rectifier, a fifth MOS transistor or a second capacitor is connected in series between the gate of a fourth MOS transistor which endures high voltage and the first input terminal of the rectifier to decrease the voltage imposed on the gate of the said fourth MOS transistor; an eighth MOS transistor is connected in series between the source of the said fourth transistor and the second input terminal of the said rectifier, and the voltage between the source and the drain of the said eighth MOS transistor is used to divide the voltage imposed by positive and negative AC input signal between the gate and the source of the said fourth MOS transistor, so the purpose of the said high-voltage-resistant rectifier in the present invention is achieved. When the first and the second MOS transistor the said bridge full-wave rectifier needs to endure high voltage, a ninth MOS transistor or a second capacitor is connected in series between the gate of the said first MOS transistor and the second input terminal of the rectifier to decrease the voltage imposed on the gate of the said first MOS transistor; and a tenth MOS transistor or a fourth capacitor is connected in series between the gate of a second MOS transistor and the first input terminal of the rectifier to decrease the voltage imposed on the gate of the said second MOS transistor;

In the next paragraph, a detailed description of the said rectifier in the present invention is given through several specific embodiments.

A First Embodiment

Figure 1:
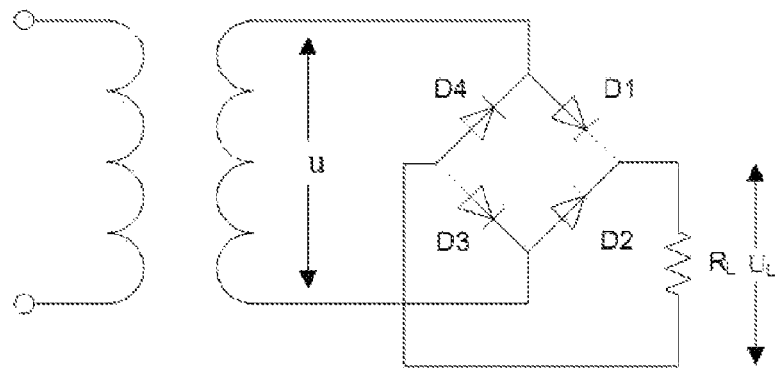
FIG. 1 is a structural diagram of a bridge full-wave rectifier which consists of rectifying diode and loading resistor in existing technology.
Figure 2A:
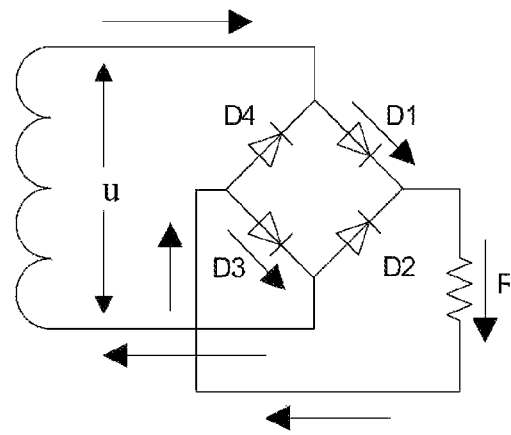
FIG. 2a is an operating principle diagram of the said bridge full-wave rectifier in FIG. 1.
Figure 2B:
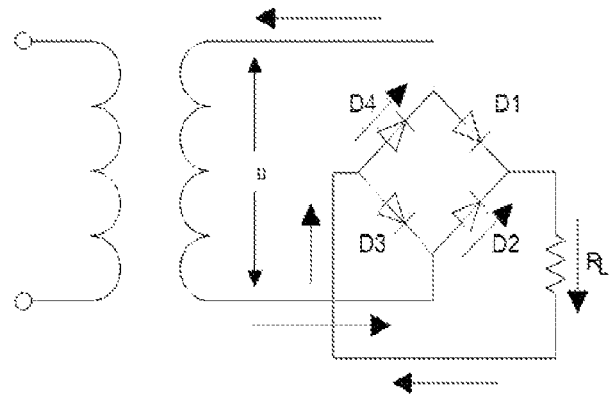
FIG. 2b is another operating principle diagram of the said bridge full-wave rectifier in FIG. 1.
Figure 3:
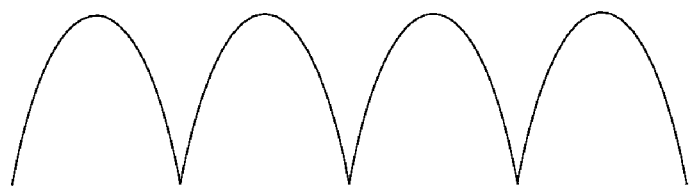
FIG. 3 is a diagram of voltage waveform after full-wave rectification.
Figure 4:
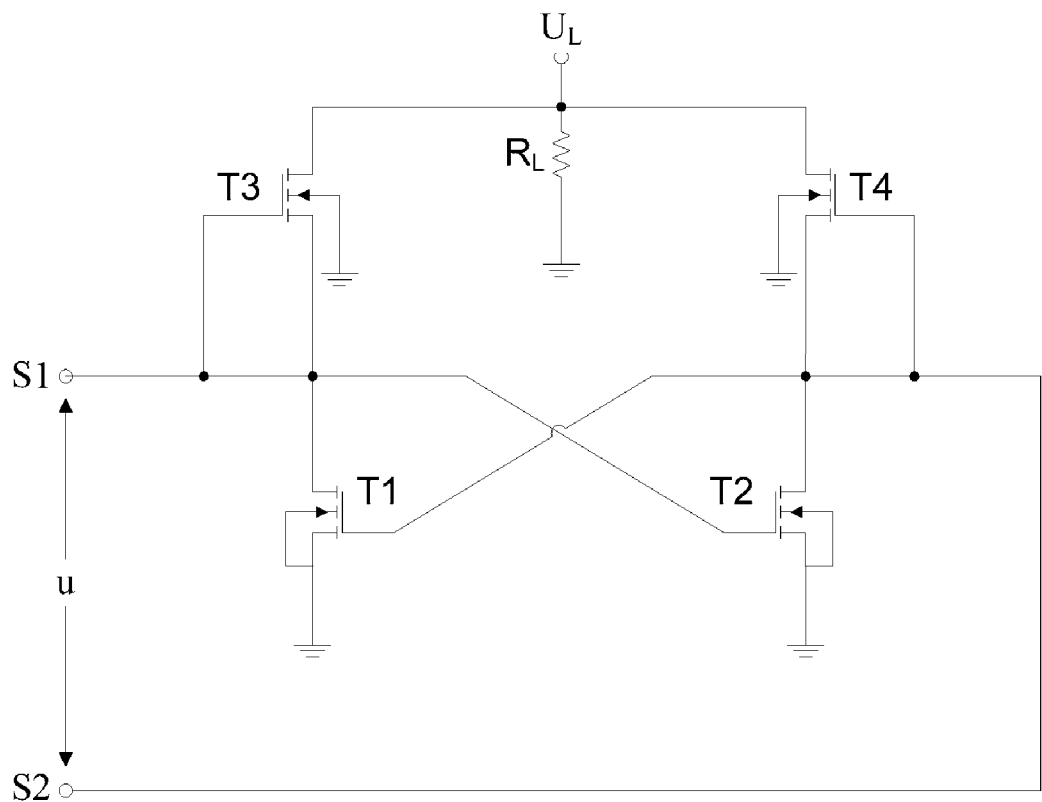
FIG. 4 is a structural diagram of a bridge full-wave rectifier which consists of CMOS transistors and loading resistor in existing technology.
Figure 5A:
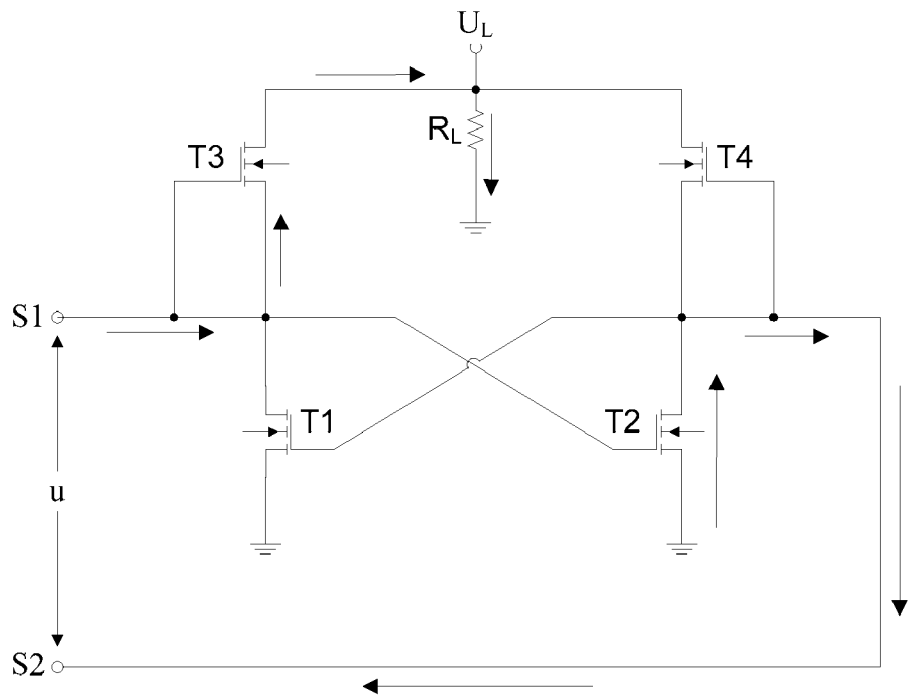
FIG. 5a is an operating principle diagram of the said bridge full-wave rectifier in FIG. 4.
Figure 5B:
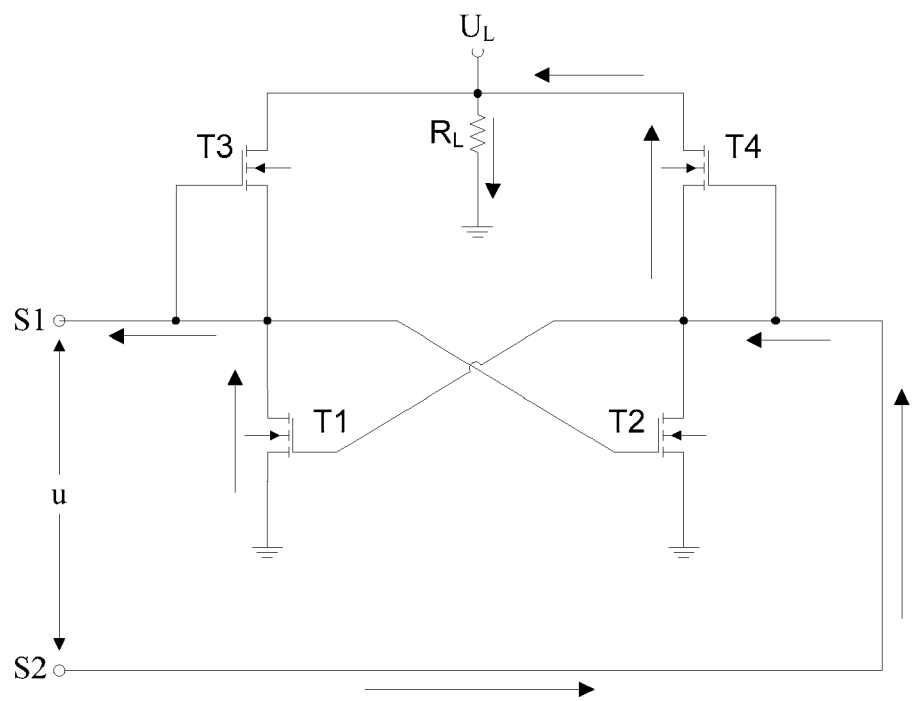
FIG. 5b is another operating principle diagram of the said bridge full-wave rectifier in FIG. 4.
Figure 6A:
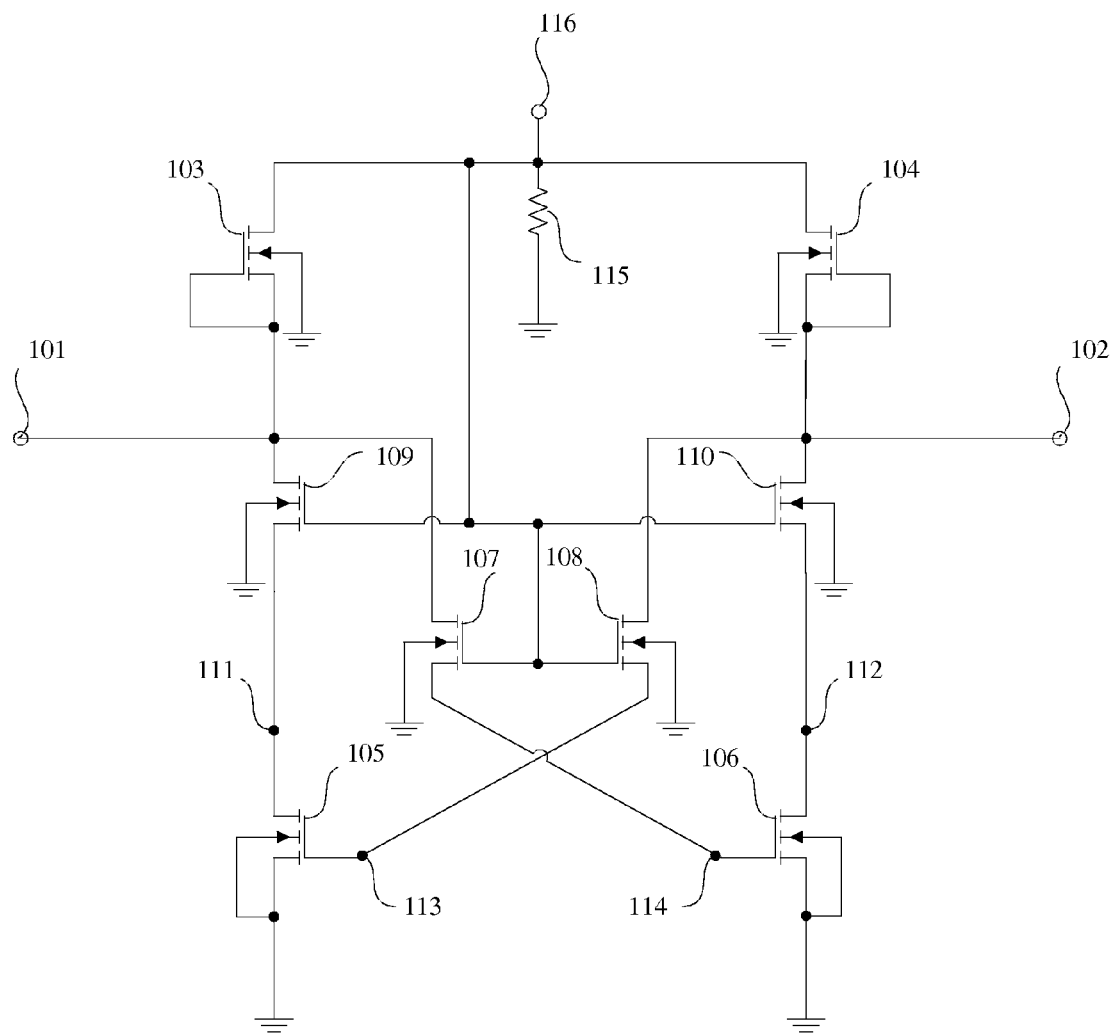
FIG. 6A is a structural diagram of an embodiment of a rectifier implemented with NMOS transistor according to the present invention.

As is shown in FIG. 6A, the rectifier comprising: an NMOS transistor 103, the gate and the drain of which are connected with each other and then to an input terminal 101, the source of which is connected to the source of NMOS transistor 104 as an output terminal 116 of the rectifier, the bulk of which is connected to the ground; the NMOS transistor 104, the gate and the drain of which are connected with each other and then to an input terminal 102, the source of which is connected to the source of the NMOS transistor 103 as the output terminal 116 of the rectifier, the bulk of which is connected to the ground; an NMOS transistor 105, the source of which is connected to the drain of an NMOS transistor 109, the gate of which is connected to the source of an NMOS transistor 108, the drain and the bulk of which are connected with each other and then to the ground; an NMOS transistor 106, the source of which is connected to the drain of an NMOS transistor 110, the gate of which is connected to the source of an NMOS transistor 107, the drain and the bulk of which are connected with each other and then to the ground; the NMOS transistor 107, the drain of which is connected to the input 101, the gate of which is connected to the output terminal 116, the source of which is connected to the gate of the NMOS transistor 106, the bulk of which is connected to the ground; the NMOS transistor 108, the drain of which is connected to the input terminal 102, the gate of which is connected to the output terminal 116, the source of which is connected to the gate of the NMOS transistor 105, the bulk of which is connected to the ground; the NMOS transistor 109, the source of which is connected to the input terminal 101, the gate of which is connected to the output terminal 116 of the rectifier, the drain of which is connected to the source of the NMOS transistor 105, the bulk of which is connected to the ground; the NMOS transistor 110, the source of which is connected to the input terminal 102, the gate of which is connected to the output terminal 116 of the rectifier, the drain of which is connected to the source of the NMOS transistor 106, the bulk of which is connected to the ground; a loading resistor 115, one end of which is connected to the output terminal 116 of the rectifier, the other is connected to the ground.

The operating principle of the rectifier implemented in the embodiment is as follows: an AC signal voltage is input into the rectifier from AC signal input the terminals 101 and 102, when AC signal input 101 is during positive cycle and the input 102 is during negative cycle, a forward voltage is imposed on the transistor 103, through the transistor 107 to the transistor 106, to turn on the transistors 103 and 106, meanwhile, it is because of adding the transistor 107 that the voltage imposed on the gate 114 of the transistor 106 from the input terminal decreases; while a reverse voltage is imposed on the transistor 104, through the transistor 108 to the transistor 105, to turn off the transistors 104 and 105, at this time the voltage between the drain and the source of the transistor 109 divides the voltage imposed by the AC signal between the gate 113 and the source 111 of the transistor 105. Thus, a forward current flows from the input terminal 101 through the drain and the source of the transistor 103→the output terminal 116 of the rectifier→the resistor 115→the ground→the drain and the source of the transistor 106→the drain and the source of the transistor 110 and back to the input terminal 102, a positive cycle rectified voltage is achieved on the resistor 115. And when the AC signal input 101 is during negative cycle and the input 102 is during positive cycle, a forward voltage is imposed on the transistor 104, through the transistor 108 to the transistor 105, to turn on the transistors 104 and 105, meanwhile, it is because of adding the transistor 108 that the voltage imposed on the gate 113 of the transistor 105 from the input terminal decreases; while a reverse voltage is imposed on the transistor 103, through the transistor 107 to the transistor 106, to turn off the transistors 103 and 106, at this time the voltage between the drain and the source of the transistor 110 divides the voltage imposed by the AC signal between the gate 114 and the source 112 of the transistor 106. Thus, a forward current flows from the input terminal 102 through the drain and the source of the transistor of 104→the output terminal 116 of the rectifier→the resistor 115→the ground→the drain and the source of the transistor 105→the drain and the source of transistor 109 and back to the input terminal 101, another positive cycle rectified voltage is achieved on the resistor 115. Therefore, according to above description, a positive full-wave rectified voltage waveform is achieved on the loading resistor 115 and is put out from the output terminal 116.

Figure 6B:
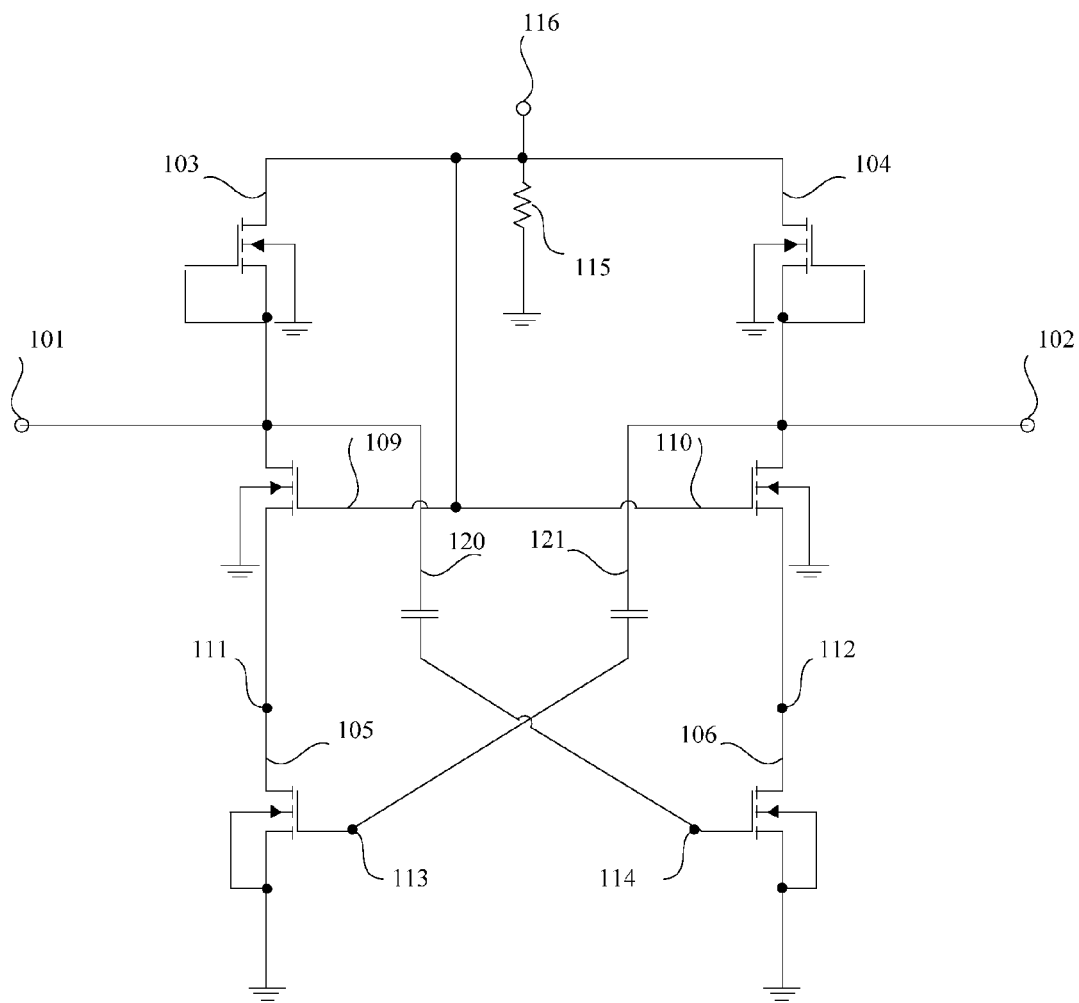
FIG. 6B is a structural diagram of an embodiment of a rectifier implemented with capacitor according to the present invention.

Furthermore, it could achieve the same result using a capacitor 120 as shown in FIG. 6B instead of the NMOS transistor 107 in FIG. 6A and/or using a capacitor 121 as shown in FIG. 6B instead of the NMOS transistor 108 in FIG. 6A.

As is shown in FIG. 6B, the rectifier comprising: an NMOS transistor 103, the gate and the drain of which are connected with each other and then to an input terminal 101, the source of which is connected to the source of NMOS transistor 104 as an output terminal 116 of the rectifier, the bulk of which is connected to the ground; the NMOS transistor 104, the gate and the drain of which are connected with each other and then to an input terminal 102, the source of which is connected to the source of the NMOS transistor 103 as the output terminal 116 of the rectifier, the bulk of which is connected to the ground; an NMOS transistor 105, the source of which is connected to the drain of an NMOS transistor 109, the gate of which is connected to the source of a capacitor 121, the drain and the bulk of which are connected with each other and then to the ground; an NMOS transistor 106, the source of which is connected to the drain of an NMOS transistor 110, the gate of which is connected to the source of a capacitor 120, the drain and the bulk of which are connected with each other and then to the ground; the capacitor 120, the drain of which is connected to the input 101, the gate of which is connected to the output terminal 116, the source of which is connected to the gate of the NMOS transistor 106, the bulk of which is connected to the ground; the capacitor 121, the drain of which is connected to the input terminal 102, the gate of which is connected to the output terminal 116, the source of which is connected to the gate of the NMOS transistor 105, the bulk of which is connected to the ground; the NMOS transistor 109, the source of which is connected to the input terminal 101, the gate of which is connected to the output terminal 116 of the rectifier, the drain of which is connected to the source of the NMOS transistor 105, the bulk of which is connected to the ground; the NMOS transistor 110, the source of which is connected to the input terminal 102, the gate of which is connected to the output terminal 116 of the rectifier, the drain of which is connected to the source of the NMOS transistor 106, the bulk of which is connected to the ground; a loading resistor 115, one end of which is connected to the output terminal 116 of the rectifier, the other is connected to the ground.

The operating principle of the rectifier implemented in the embodiment is as follows: an AC signal voltage is input into the rectifier from AC signal input the terminals 101 and 102, when AC signal input 101 is during positive cycle and the input 102 is during negative cycle, a forward voltage is imposed on the transistor 103, through the capacitor 120 to the transistor 106, to turn on the transistors 103 and 106, meanwhile, it is because of adding the capacitor 120 that the voltage imposed on the gate 114 of the transistor 106 from the input terminal decreases; while a reverse voltage is imposed on the transistor 104, through the capacitor 121 to the transistor 105, to turn off the transistors 104 and 105, at this time the voltage between the drain and the source of the transistor 109 divides the voltage imposed by the AC signal between the gate 113 and the source 111 of the transistor 105. Thus, a forward current flows from the input terminal 101 through the drain and the source of the transistor 103→the output terminal 116 of the rectifier→the resistor 115→the ground→the drain and the source of the transistor 106→the drain and the source of the transistor 110 and back to the input terminal 102, a positive cycle rectified voltage is achieved on the resistor 115. And when the AC signal input 101 is during negative cycle and the input 102 is during positive cycle, a forward voltage is imposed on the transistor 104, through the capacitor 121 to the transistor 105, to turn on the transistors 104 and 105, meanwhile, it is because of adding the capacitor 121 that the voltage imposed on the gate 113 of the transistor 105 from the input terminal decreases; while a reverse voltage is imposed on the transistor 103, through the capacitor 120 to the transistor 106, to turn off the transistors 103 and 106, at this time the voltage between the drain and the source of the transistor 110 divides the voltage imposed by the AC signal between the gate 114 and the source 112 of the transistor 106. Thus, a forward current flows from the input terminal 102 through the drain and the source of the transistor of 104→the output terminal 116 of the rectifier→the resistor 115→the ground→the drain and the source of the transistor 105→the drain and the source of transistor 109 and back to the input terminal 101, another positive cycle rectified voltage is achieved on the resistor 115. Therefore, according to above description, a positive full-wave rectified voltage waveform is achieved on the loading resistor 115 and is put out from the output terminal 116.

A Second Embodiment

Figure 7A:
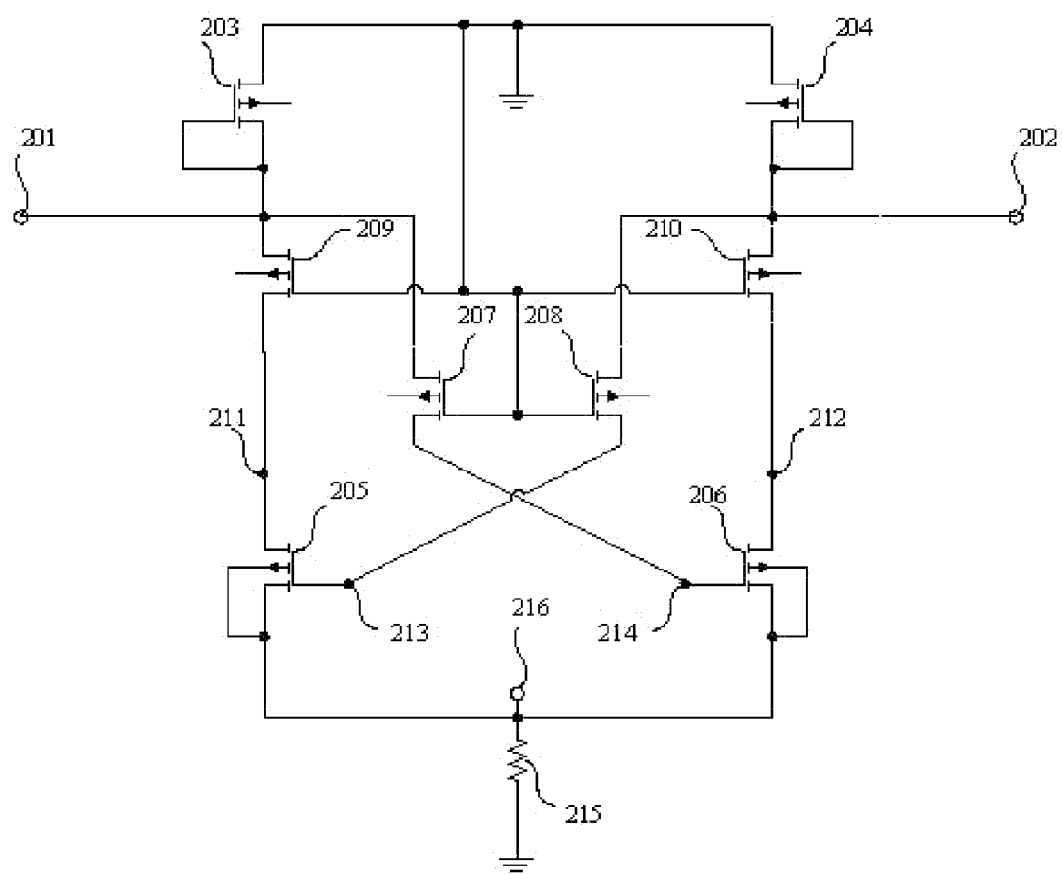
FIG. 7A is a structural diagram of an embodiment of a rectifier implemented with PMOS transistor according to the present invention.

As is shown in FIG. 7A, the rectifier comprising: a PMOS transistor 203, the gate and the drain of which are connected with each other and then to an input terminal 201, the source of which is connected to the ground, the bulk of which is connected to an output terminal 216 of the rectifier; a PMOS transistor 204, the gate and the drain of which are connected with each other and then to an input 202, the source of which is connected to the ground, the bulk of which is connected to the output terminal 216 of the rectifier; a PMOS transistor 205, the source of which is connected to the drain of a PMOS transistor 209, the source of which is connected to the drain of a PMOS transistor 208, the drain and the bulk of which are connected with each other and as the input terminal 216 of the rectifier; a PMOS transistor 206, the source of which is connected to the drain of a PMOS transistor 210, the gate of which is connected to the drain of a PMOS transistor 207, the drain and the bulk of which are connected with each other and as the output terminal 216 of the rectifier; the PMOS transistor 207, the source of which is connected to the input terminal 201, the gate of which is connected to the ground, the drain of which is connected to the gate of the PMOS transistor 206, the bulk of which is connected to the output terminal 216 of the rectifier; the PMOS transistor 208, the source of which is connected to the input terminal 202, the gate of which is connected to the ground, the drain of which is connected to the gate of the PMOS transistor 205, the bulk of which is connected to the output terminal 216 of the rectifier, the PMOS transistor 209, the source of which is connected to the input terminal 201, the gate of which is connected to the ground, the drain of which is connected to the source of the PMOS transistor 205, the bulk of which is connected to the output terminal 216 of the rectifier; the PMOS transistor 210, the source of which is connected to the input terminal 202, the gate of which is connected to the ground, the drain of which is connected to the source of the PMOS transistor 206, the bulk of which is connected to the output terminal 216 of the rectifier; a load resistor 215, one end of which is connected to the output terminal 216 of the rectifier, the other is connected to the ground.

The operating principle of the rectifier implemented in the embodiment is as follows: an AC signal voltage is input into the rectifier from the AC signal input terminals 201 and 202, when the AC signal input 201 is during negative cycle and the input 202 is during positive cycle, a reverse voltage is imposed on the transistor 203, through the transistor 207 to the transistor 206, to turn on the transistors 203 and 206, meanwhile, it is because of adding the transistor 207 that the voltage imposed on the gate 214 of the transistor 206 from the input terminal decreases; while a forward voltage is imposed on the transistor 204, through the transistor 208 to the transistor 205, to turn off the transistors 204 and 205, at this time the voltage between the drain and the source of the transistor 209 divides the voltage imposed by the AC signal between the gate 213 and the source 211 of the transistor 205. Thus, a forward current flows from the input terminal 202 through the drain and the source of the transistor of 210→the source and the drain of the transistor 206→the output terminal 216 of the rectifier→the resistor 215→the ground→the drain and the source of the transistor 203 and back to the input terminal 201, a positive cycle rectified voltage is achieved on the resistor 215. And when the AC signal input 201 is during positive cycle and the input 202 is during negative cycle, a reverse voltage is imposed on the transistor 204, through the transistor 208 to the transistor 205, to turn on the transistors 204 and 205, meanwhile, it is because of adding the transistor 208 that the voltage imposed on the gate 213 of the transistor 205 from the input terminal decreases; while a forward voltage is imposed on the transistor 203, through the transistor 207 to the transistor 206, to turn off the transistors 203 and 206, at this time the voltage between the drain and the source of the transistor 210 divides the voltage imposed by the AC signal between the gate 214 and the source 212 of the transistor 106. Thus, a forward current flows from the input terminal 201 through the drain and the source of the transistor of 209→the drain and the source of the transistor 205→the output terminal 216 of the rectifier→resistor 215→the ground→the drain and the source of the transistor 204 and back to the input terminal 202, another positive cycle rectified voltage is achieved on the resistor 215. Therefore, according to above description, a positive full-wave rectified voltage waveform is achieved on the loading resistor 215 and is put out from the output terminal 216 of the rectifier.

Figure 7B:
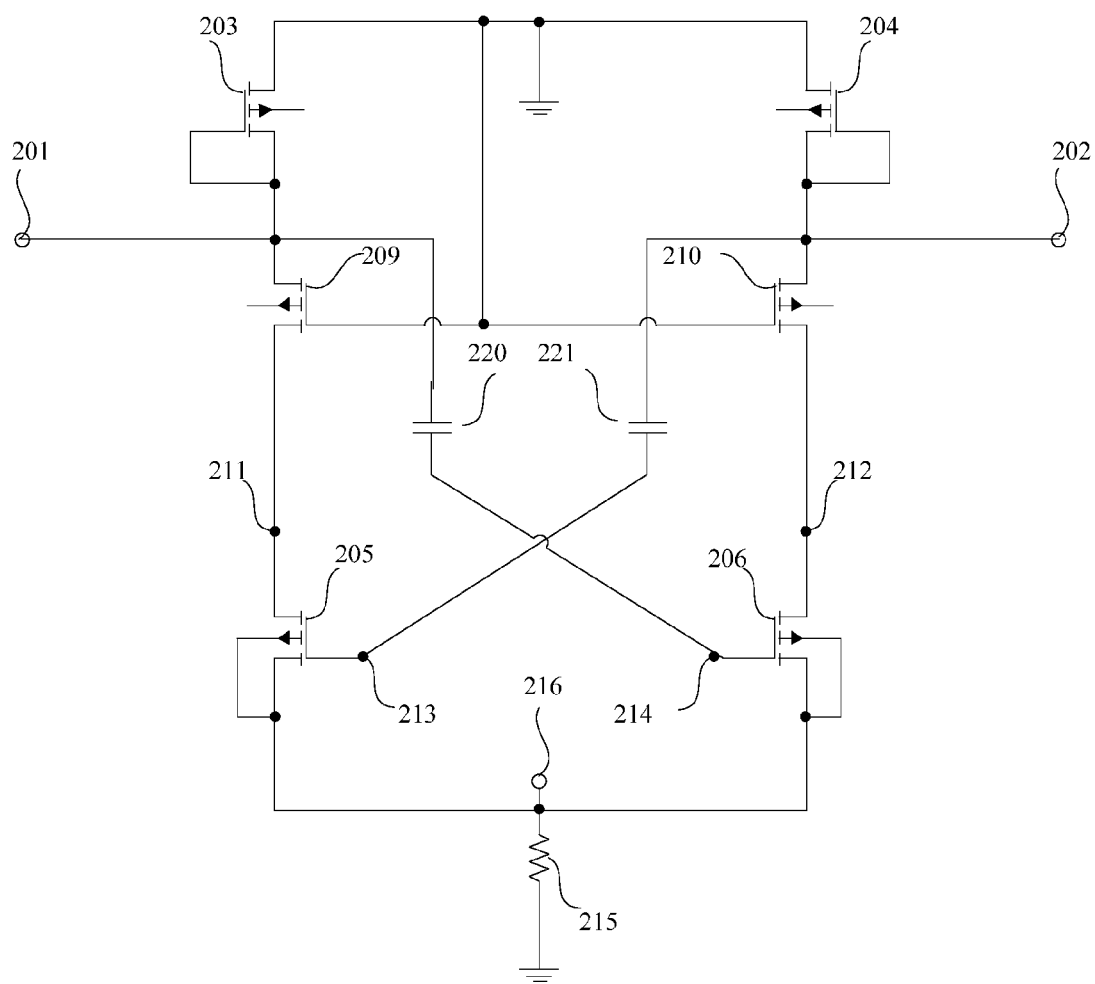
FIG. 7B is a structural diagram of an embodiment of a rectifier implemented with capacitor according to the present invention.

Furthermore, it could achieve the same result using a capacitor 220 as shown in FIG. 7B instead of the PMOS transistor 207 in FIG. 7A and/or using a capacitor 221 as shown in FIG. B instead of the PMOS transistor 208 in FIG. 7A.

As is shown in FIG. 7B, the rectifier comprising: a PMOS transistor 203, the gate and the drain of which are connected with each other and then to an input terminal 201, the source of which is connected to the ground, the bulk of which is connected to an output terminal 216 of the rectifier, a PMOS transistor 204, the gate and the drain of which are connected with each other and then to an input 202, the source of which is connected to the ground, the bulk of which is connected to the output terminal 216 of the rectifier; a PMOS transistor 205, the source of which is connected to the drain of a PMOS transistor 209, the source of which is connected to the drain of a capacitor 221, the drain and the bulk of which are connected with each other and as the input terminal 216 of the rectifier; a PMOS transistor 206, the source of which is connected to the drain of a PMOS transistor 210, the gate of which is connected to the drain of a capacitor 220, the drain and the bulk of which are connected with each other and as the output terminal 216 of the rectifier; the capacitor 220, the source of which is connected to the input terminal 201, the gate of which is connected to the ground, the drain of which is connected to the gate of the PMOS transistor 206, the bulk of which is connected to the output terminal 216 of the rectifier; the capacitor 221, the source of which is connected to the input terminal 202, the gate of which is connected to the ground, the drain of which is connected to the gate of the PMOS transistor 205, the bulk of which is connected to the output terminal 216 of the rectifier; the PMOS transistor 209, the source of which is connected to the input terminal 201, the gate of which is connected to the ground, the drain of which is connected to the source of the PMOS transistor 205, the bulk of which is connected to the output terminal 216 of the rectifier; the PMOS transistor 210, the source of which is connected to the input terminal 202, the gate of which is connected to the ground, the drain of which is connected to the source of the PMOS transistor 206, the bulk of which is connected to the output terminal 216 of the rectifier; a load resistor 215, one end of which is connected to the output terminal 216 of the rectifier, the other is connected to the ground.

The operating principle of the rectifier implemented in the embodiment is as follows: an AC signal voltage is input into the rectifier from the AC signal input terminals 201 and 202, when the AC signal input 201 is during negative cycle and the input 202 is during positive cycle, a reverse voltage is imposed on the transistor 203, through the capacitor 220 to the transistor 206, to turn on the transistors 203 and 206, meanwhile, it is because of adding the capacitor 220 that the voltage imposed on the gate 214 of the transistor 206 from the input terminal decreases; while a forward voltage is imposed on the transistor 204, through the capacitor 221 to the transistor 205, to turn off the transistors 204 and 205, at this time the voltage between the drain and the source of the transistor 209 divides the voltage imposed by the AC signal between the gate 213 and the source 211 of the transistor 205. Thus, a forward current flows from the input terminal 202 through the drain and the source of the transistor of 210→the source and the drain of the transistor 206→the output terminal 216 of the rectifier→the resistor 215→the ground→the drain and the source of the transistor 203 and back to the input terminal 201, a positive cycle rectified voltage is achieved on the resistor 215. And when the AC signal input 201 is during positive cycle and the input 202 is during negative cycle, a reverse voltage is imposed on the transistor 204, through the capacitor 221 to the transistor 205, to turn on the transistors 204 and 205, meanwhile, it is because of adding the capacitor 221 that the voltage imposed on the gate 213 of the transistor 205 from the input terminal decreases; while a forward voltage is imposed on the transistor 203, through the capacitor 220 to the transistor 206, to turn off the transistors 203 and 206, at this time the voltage between the drain and the source of the transistor 210 divides the voltage imposed by the AC signal between the gate 214 and the source 212 of the transistor 106. Thus, a forward current flows from the input terminal 201 through the drain and the source of the transistor of 209→the drain and the source of the transistor 205→the output terminal 216 of the rectifier→resistor 215→the ground→the drain and the source of the transistor 204 and back to the input terminal 202, another positive cycle rectified voltage is achieved on the resistor 215. Therefore, according to above description, a positive full-wave rectified voltage waveform is achieved on the loading resistor 215 and is put out from the output terminal 216 of the rectifier.

A Third Embodiment

Figure 8A:
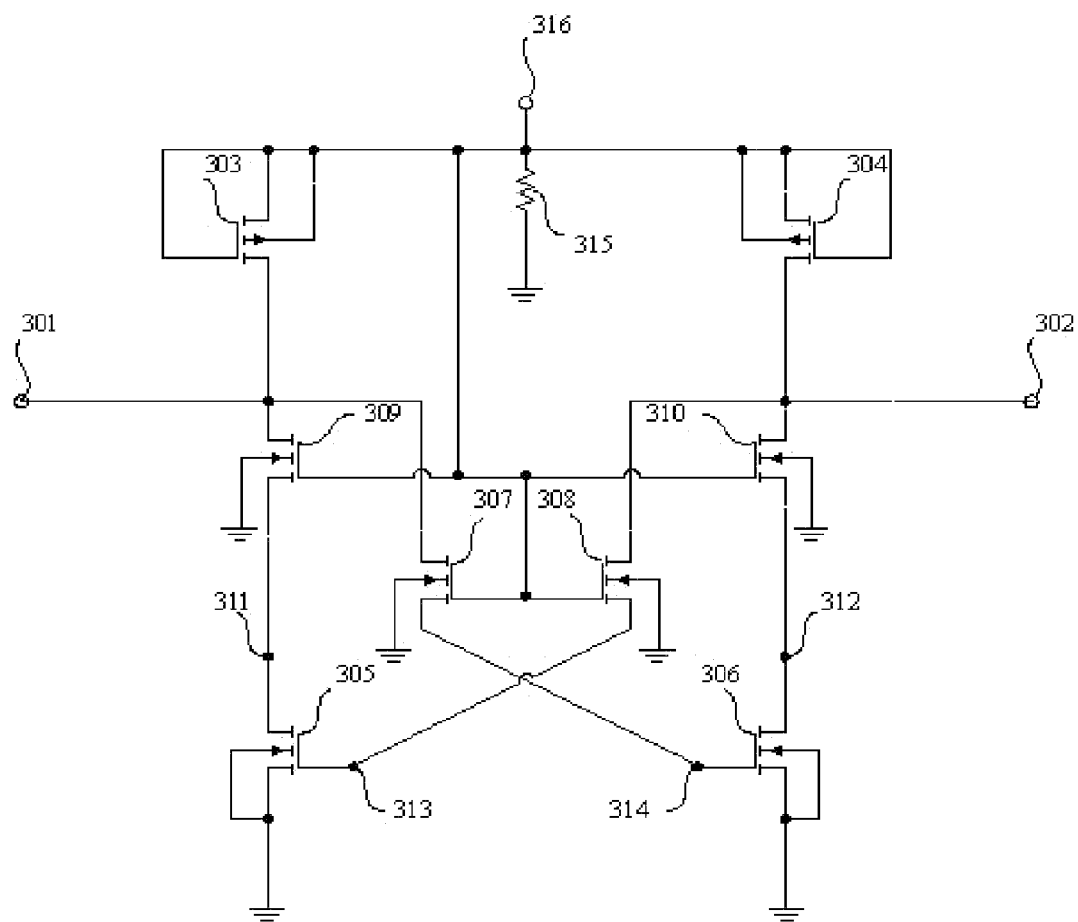
FIG. 8A is a structural diagram of an embodiment of a rectifier implemented with PMOS and NMOS transistor according to the present invention.

As is shown in FIG. 8A, the rectifier comprising: a PMOS transistor 303, the source of which is connected to an input terminal 301, the gate and the drain and the bulk of which are connected with each other and then to the gate, the drain and the bulk of a PMOS transistor 304 as an output terminal 316 of the rectifier; the PMOS transistor 304, the source of which is connected to an input terminal 302, the gate, the drain, the bulk are connected with each other and then to the gate, the drain and the bulk of the PMOS transistor 303 as the output terminal 316 of the rectifier; an NMOS transistor 305, the source of which is connected to the drain of an NMOS transistor 309, the gate of which is connected to the source of an NMOS transistor 308, the drain and the bulk of which are connected with each other and then to the ground; an NMOS transistor 306, the source of which is connected to the drain of an NMOS transistor 310, the gate of which is connected to the source of an NMOS transistor 307, the drain and the bulk of which are connected with each other and then to the ground; the NMOS transistor 307, the drain of which is connected to the input terminal 301, the gate of which is connected to the output terminal 316 of the rectifier, the source of which is connected to the gate of the NMOS transistor 306, the bulk of which is connected to the ground; the NMOS transistor 308, the drain of which is connected to the input terminal 302, the gate of which is connected to output terminal 316 of the rectifier, the source of which is connected to the gate of the NMOS transistor 305, the bulk of which is connected to the ground; the NMOS transistor 309, the source of which is connected to the input terminal 301, the gate of which is connected to the output terminal 316 of the rectifier, the drain of which is connected to the source of the NMOS transistor 305, the bulk of which is connected to the ground; the NMOS transistor 310, the source of which is connected to the input terminal 302, the gate is connected to the output terminal 316 of the rectifier, the drain of which is connected to the source of the NMOS transistor 306, the bulk of which is connected to the ground; a loading resistor 315, one end of which is connected to the output terminal 316 of the rectifier, the other is connected to the ground.

In the embodiment, when the AC signal input 301 is during positive cycle and the input 302 is during negative cycle, a forward current flows from the input terminal 301 through the drain and the source of the transistor 303→the output terminal 316 of the rectifier→the resistor 315→the ground→the drain and the source of the transistor 306→the drain and the source of the transistor 310 and back to the input terminal 302, a positive cycle rectified voltage is achieved on the resistor 315, meanwhile, it is because of adding the transistor 307 that the voltage imposed on the gate 314 of the transistor 306 from the input terminal decreases, the voltage between the drain and the source of the transistor 309 divides the voltage imposed by the AC signal between the gate 313 and the source 311 of the transistor 305. And when the AC signal input 301 is during negative cycle and the input 302 is during positive cycle, a forward current flows from the input terminal 302 through the drain and the source of the transistor of 304→the output terminal 316 of the rectifier→the resistor 315→the ground→the drain and the source of the transistor 305→the drain and the source of the transistor 309 and back to the input terminal 301, another positive cycle rectified voltage is achieved on the resistor 315, meanwhile, it is because of adding the transistor 308 that the voltage imposed on the gate 313 of the transistor 305 from the input terminal decreases, the voltage between the drain and the source of the transistor 310 divides the voltage imposed by the AC signal between the gate 314 and the source 312 of the transistor 306. Therefore, according to the above description, a positive full-wave rectified voltage waveform is achieved on the loading resistor 315 and is put out from the output terminal 316 of the rectifier.

Figure 8B:
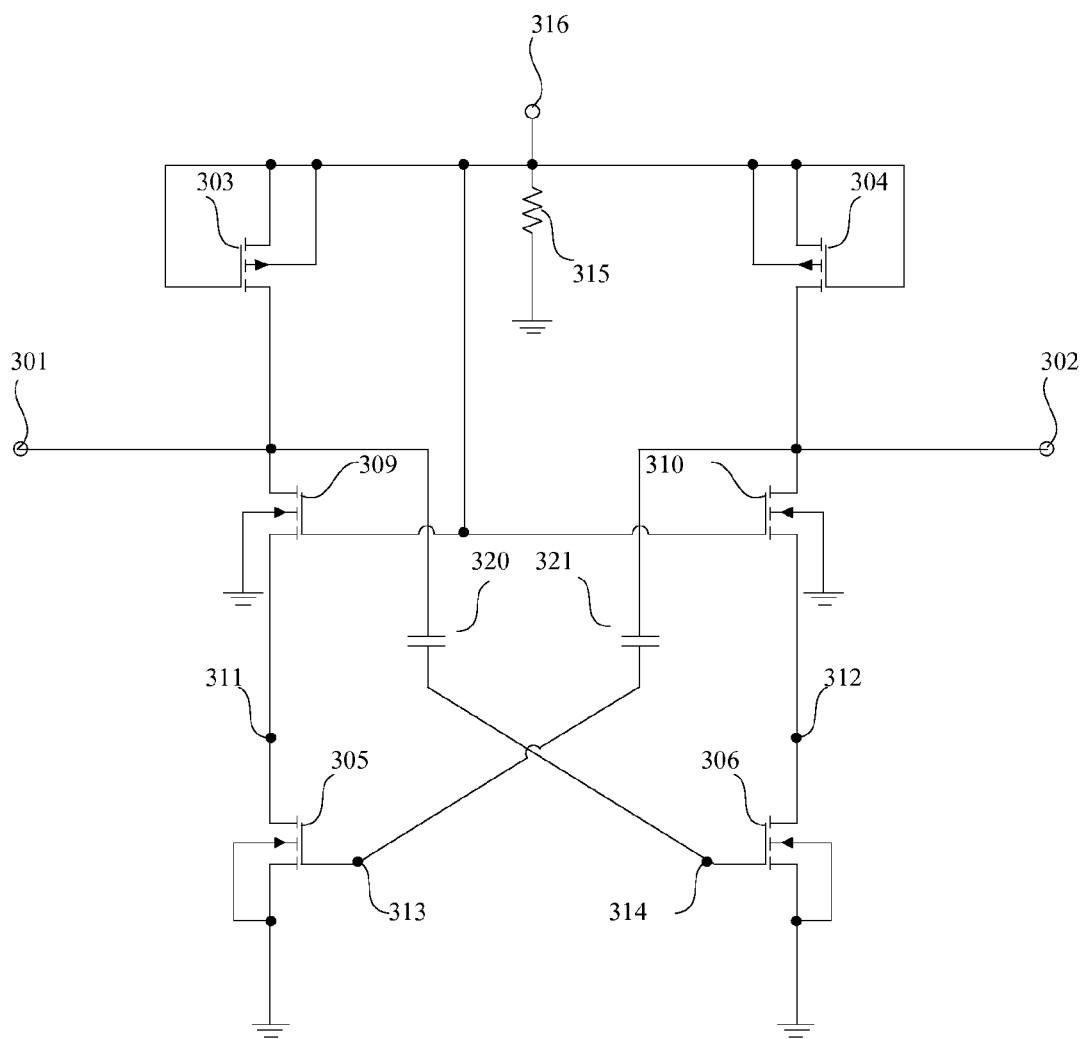
FIG. 8B is a structural diagram of an embodiment of a rectifier implemented with capacitor according to the present invention.

Furthermore, it could achieve the same result using a capacitor 320 as shown in FIG. 8B instead of the NMOS transistor 307 in FIG. 8A and/or using a capacitor 321 as shown in FIG. 8B instead of the NMOS transistor 308 in FIG. 8A.

As is shown in FIG. 8B, the rectifier comprising: a PMOS transistor 303, the source of which is connected to an input terminal 301, the gate and the drain and the bulk of which are connected with each other and then to the gate, the drain and the bulk of a PMOS transistor 304 as an output terminal 316 of the rectifier; the PMOS transistor 304, the source of which is connected to an input terminal 302, the gate, the drain, the bulk are connected with each other and then to the gate, the drain and the bulk of the PMOS transistor 303 as the output terminal 316 of the rectifier; an NMOS transistor 305, the source of which is connected to the drain of an NMOS transistor 309, the gate of which is connected to the source of an capacitor 321, the drain and the bulk of which are connected with each other and then to the ground; an NMOS transistor 306, the source of which is connected to the drain of an NMOS transistor 310, the gate of which is connected to the source of an capacitor 320, the drain and the bulk of which are connected with each other and then to the ground; the capacitor 320, the drain of which is connected to the input terminal 301, the gate of which is connected to the output terminal 316 of the rectifier, the source of which is connected to the gate of the NMOS transistor 306, the bulk of which is connected to the ground; the capacitor 321, the drain of which is connected to the input terminal 302, the gate of which is connected to output terminal 316 of the rectifier, the source of which is connected to the gate of the NMOS transistor 305, the bulk of which is connected to the ground; the NMOS transistor 309, the source of which is connected to the input terminal 301, the gate of which is connected to the output terminal 316 of the rectifier, the drain of which is connected to the source of the NMOS transistor 305, the bulk of which is connected to the ground; the NMOS transistor 310, the source of which is connected to the input terminal 302, the gate is connected to the output terminal 316 of the rectifier, the drain of which is connected to the source of the NMOS transistor 306, the bulk of which is connected to the ground; a loading resistor 315, one end of which is connected to the output terminal 316 of the rectifier, the other is connected to the ground.

In the embodiment, when the AC signal input 301 is during positive cycle and the input 302 is during negative cycle, a forward current flows from the input terminal 301 through the drain and the source of the transistor 303→the output terminal 316 of the rectifier→the resistor 315→the ground→the drain and the source of the transistor 306→the drain and the source of the transistor 310 and back to the input terminal 302, a positive cycle rectified voltage is achieved on the resistor 315, meanwhile, it is because of adding the capacitor 320 that the voltage imposed on the gate 314 of the transistor 306 from the input terminal decreases, the voltage between the drain and the source of the transistor 309 divides the voltage imposed by the AC signal between the gate 313 and the source 311 of the transistor 305. And when the AC signal input 301 is during negative cycle and the input 302 is during positive cycle, a forward current flows from the input terminal 302 through the drain and the source of the transistor of 304→the output terminal 316 of the rectifier→the resistor 315→the ground→the drain and the source of the transistor 305→the drain and the source of the transistor 309 and back to the input terminal 301, another positive cycle rectified voltage is achieved on the resistor 315, meanwhile, it is because of adding the capacitor 321 that the voltage imposed on the gate 313 of the transistor 305 from the input terminal decreases, the voltage between the drain and the source of the transistor 310 divides the voltage imposed by the AC signal between the gate 314 and the source 312 of the transistor 306. Therefore, according to the above description, a positive full-wave rectified voltage waveform is achieved on the loading resistor 315 and is put out from the output terminal 316 of the rectifier.

A Fourth Embodiment

Figure 9A:
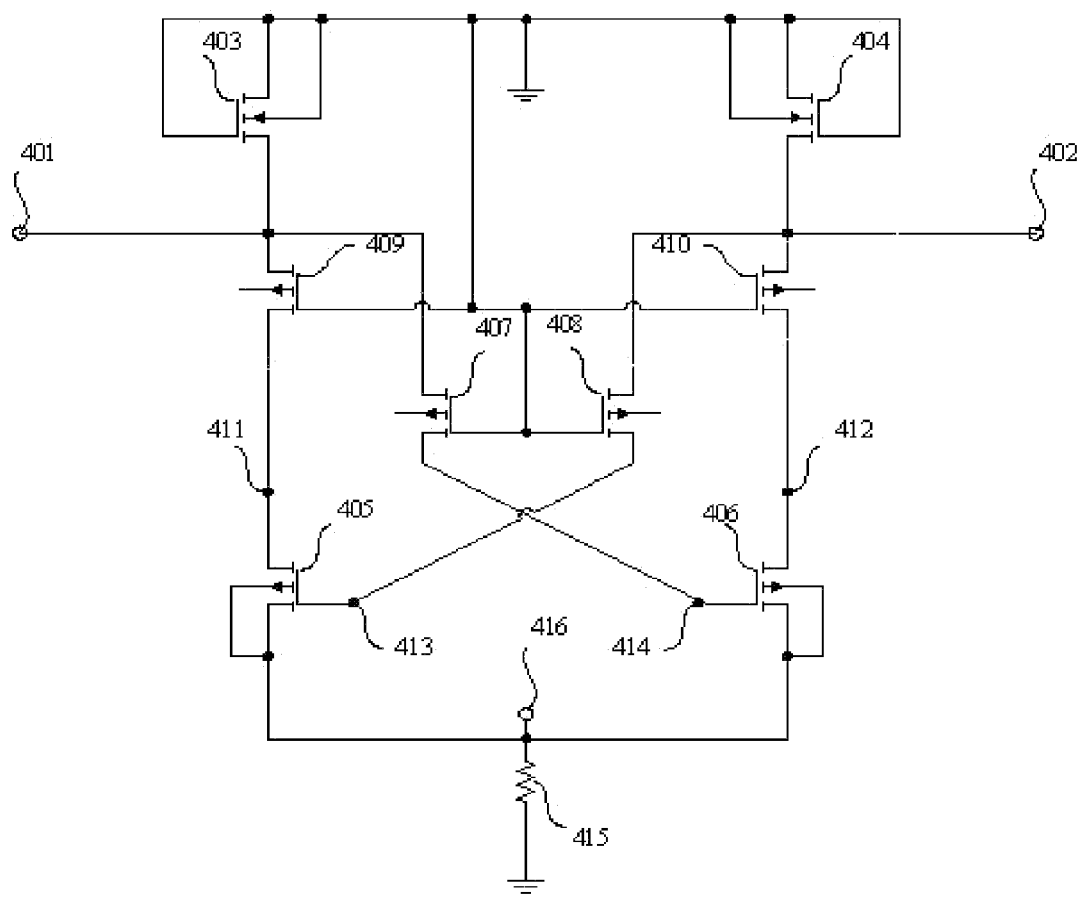
FIG. 9A is a structural diagram of an embodiment of a rectifier implemented with NMOS and PMOS transistor according to the present invention.

As is shown in FIG. 9A, the rectifier comprising: an NMOS transistor 403, the source of which is connected to an input terminal 401, the gate and the drain of which are connected with each other and then to ground, the bulk of which is connected to the ground; an NMOS transistor 404, the source of which is connected to an input terminal 402, the gate and the drain of which are connected with each other and then to the ground, the bulk of which is connected to the ground; a PMOS transistor 405, the source of which is connected to the drain of a PMOS transistor 409, the gate of which is connected to the drain of a PMOS transistor 408, the drain and the bulk of which are connected with each other and as an output terminal 416 of the rectifier, a PMOS transistor 406, the source of which is connected to the drain of a PMOS transistor 410, the gate of which is connected to the drain of a PMOS transistor 407, the drain and the bulk of which are connected with each other and as the output terminal 416 of the rectifier; the PMOS transistor 407, the source of which is connected to the input terminal 401, the gate of which is connected to the ground, the drain of which is connected to the gate of the PMOS transistor 406, the bulk of which is connected to the output terminal 416 of the rectifier; the PMOS transistor 408, the source of which is connected to the input terminal 402, the gate of which is connected to the ground, the drain of which is connected to the gate of the PMOS transistor 405, the bulk of which is connected to the output terminal 416 of the rectifier; the PMOS transistor 409, the source of which is connected to the input terminal 401, the gate is connected to the ground, the drain of which is connected to the source of the PMOS transistor 405, the bulk is connected to the output terminal 416 of the rectifier; the PMOS transistor 410, the source of which is connected to the input terminal 402, the gate of which is connected to the ground, the drain of which is connected to the source of the PMOS transistor 406, the bulk of which is connected to the output terminal 416 of the rectifier; a loading resistor 415, one end of which is connected to the output terminal 416 of the rectifier, the other is connected to the ground.

In the embodiment, when the AC signal input 401 is during negative cycle and the input 302 is during positive cycle, a forward current flows from the input terminal 402 through the drain and the source of the transistor of 410→the drain and the source of the transistor of 406→the output terminal 416 of the rectifier→the resistor 415→the ground→the drain and the source of the transistor 403 and back to the input terminal 401, a positive cycle rectified voltage is achieved on the resistor 415, meanwhile, it is because of adding the transistor 407 that the voltage imposed on the gate 414 of the transistor 406 from the input terminal decreases, the voltage between the drain and the source of the transistor 409 divides the voltage imposed by the AC signal between the gate 413 and the source 411 of the transistor 405. And When AC signal input 401 is during positive cycle and the input 402 is during negative cycle, a forward current flows from the input terminal 401 through the drain and the source of the transistor of 409→the drain and the source of transistor of 405→the output terminal 416 of the rectifier→the resistor 415→the ground→the drain and the source of the transistor 404 and back to the input terminal 402, another positive cycle rectified voltage is achieved on the resistor 415, meanwhile, it is because of adding the transistor 408 that the voltage imposed on the gate 413 of the transistor 405 from the input terminal decreases, the voltage between the drain and the source of the transistor 410 divides the voltage imposed by the AC signal between the gate 414 and the source 412 of the transistor 406. Therefore, according to the above description, a positive full-wave rectified voltage waveform is achieved on the loading resistor 415 and is put out from the output terminal 416 of the rectifier.

Figure 9B:
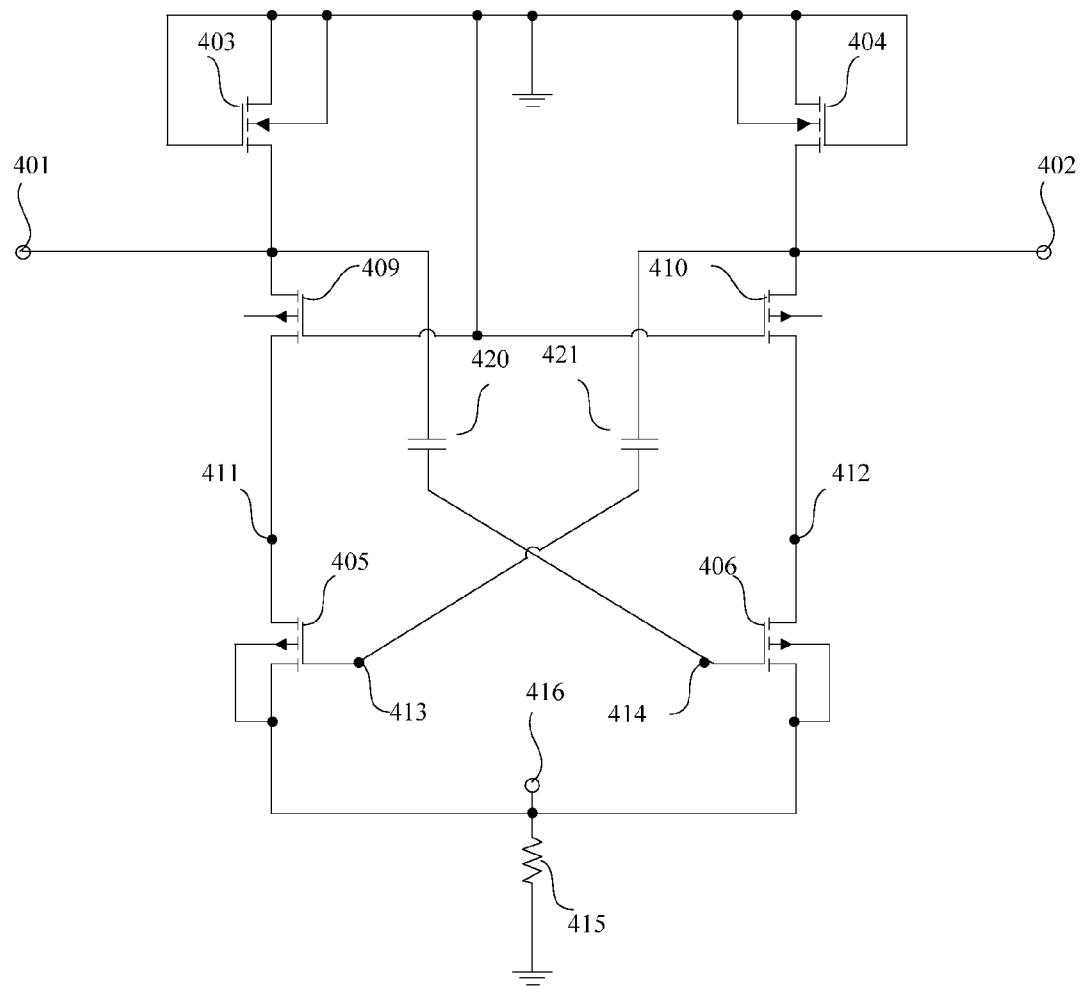
FIG. 9B is a structural diagram of an embodiment of a rectifier implemented with capacitor according to the present invention.

Furthermore, it could achieve the same result using a capacitor 420 as shown in FIG. 9B instead of the PMOS transistor 407 in FIG. 9A and/or using a capacitor 421 in FIG. 9B instead of the PMOS transistor 408 in FIG. 9A.

As is shown in FIG. 9B, the rectifier comprising: an NMOS transistor 403, the source of which is connected to an input terminal 401, the gate and the drain of which are connected with each other and then to ground, the bulk of which is connected to the ground; an NMOS transistor 404, the source of which is connected to an input terminal 402, the gate and the drain of which are connected with each other and then to the ground, the bulk of which is connected to the ground; a PMOS transistor 405, the source of which is connected to the drain of a PMOS transistor 409, the gate of which is connected to the drain of a capacitor 421, the drain and the bulk of which are connected with each other and as an output terminal 416 of the rectifier, a PMOS transistor 406, the source of which is connected to the drain of a PMOS transistor 410, the gate of which is connected to the drain of a capacitor 420, the drain and the bulk of which are connected with each other and as the output terminal 416 of the rectifier; the capacitor 420, the source of which is connected to the input terminal 401, the gate of which is connected to the ground, the drain of which is connected to the gate of the PMOS transistor 406, the bulk of which is connected to the output terminal 416 of the rectifier; the capacitor 421, the source of which is connected to the input terminal 402, the gate of which is connected to the ground, the drain of which is connected to the gate of the PMOS transistor 405, the bulk of which is connected to the output terminal 416 of the rectifier; the PMOS transistor 409, the source of which is connected to the input terminal 401, the gate is connected to the ground, the drain of which is connected to the source of the PMOS transistor 405, the bulk is connected to the output terminal 416 of the rectifier; the PMOS transistor 410, the source of which is connected to the input terminal 402, the gate of which is connected to the ground, the drain of which is connected to the source of the PMOS transistor 406, the bulk of which is connected to the output terminal 416 of the rectifier; a loading resistor 415, one end of which is connected to the output terminal 416 of the rectifier, the other is connected to the ground.

In the embodiment, when the AC signal input 401 is during negative cycle and the input 302 is during positive cycle, a forward current flows from the input terminal 402 through the drain and the source of the transistor of 410→the drain and the source of the transistor of 406→the output terminal 416 of the rectifier→the resistor 415→the ground→the drain and the source of the transistor 403 and back to the input terminal 401, a positive cycle rectified voltage is achieved on the resistor 415, meanwhile, it is because of adding the capacitor 420 that the voltage imposed on the gate 414 of the transistor 406 from the input terminal decreases, the voltage between the drain and the source of the transistor 409 divides the voltage imposed by the AC signal between the gate 413 and the source 411 of the transistor 405. And When AC signal input 401 is during positive cycle and the input 402 is during negative cycle, a forward current flows from the input terminal 401 through the drain and the source of the transistor of 409→the drain and the source of transistor of 405→the output terminal 416 of the rectifier→the resistor 415→the ground→the drain and the source of the transistor 404 and back to the input terminal 402, another positive cycle rectified voltage is achieved on the resistor 415, meanwhile, it is because of adding the capacitor 421 that the voltage imposed on the gate 413 of the transistor 405 from the input terminal decreases, the voltage between the drain and the source of the transistor 410 divides the voltage imposed by the AC signal between the gate 414 and the source 412 of the transistor 406. Therefore, according to the above description, a positive full-wave rectified voltage waveform is achieved on the loading resistor 415 and is put out from the output terminal 416 of the rectifier.

A Fifth Embodiment

Figure 10A:
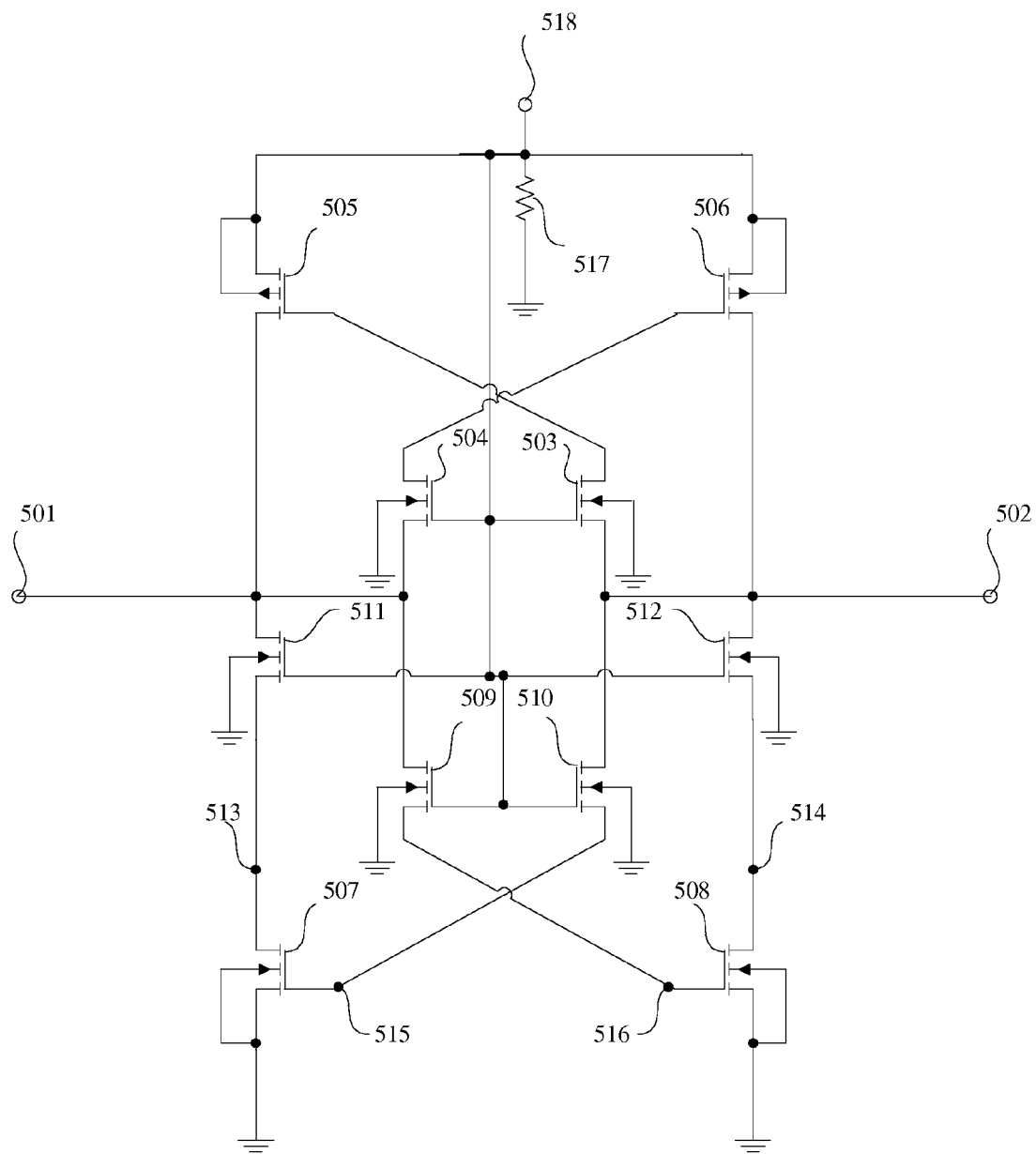
FIG. 10A is a structural diagram of an embodiment of a rectifier implemented with PMOS and NMOS transistor according to the present invention.

As is shown in FIG. 10A, the rectifier comprising: an NMOS transistor 503, the drain of which is connected to an input terminal 502, the gate of which is connected to an output terminal 518 of the rectifier, the source of which is connected to the gate of a PMOS transistor 505, the bulk of which is connected to the ground; an NMOS transistor 504, the drain of which is connected to an input terminal 501, the gate of which is connected to an output terminal 518 of the rectifier, the source of which is connected to the gate of a PMOS transistor 506, the bulk of which is connected to the ground; a PMOS transistor 505, the source of which is connected to the input terminal 501, the gate of which is connected to the source of the NMOS transistor 503, the drain and the bulk of which are connected with each other and as the output terminal 518 of the rectifier; a PMOS transistor 506, the source of which is connected to the input terminal 502, the gate of which is connected to the source of the NMOS transistor 504, the drain and the bulk of which are connected with each other and as the output terminal 518 of the rectifier; an NMOS transistor 507, the source of which is connected to the drain of an NMOS transistor 511, the gate of which is connected to the source of an NMOS transistor 510, the drain and the bulk of which are connected with each other and then to the ground; an NMOS transistor 508, the source of which is connected to the drain of an NMOS transistor 512, the gate of which is connected to the source of an NMOS transistor 509, the drain and the bulk of which are connected with each other and then to the ground; the NMOS transistor 509, the drain of which is connected to the input terminal 501, the gate of which is connected to the output terminal 518 of the rectifier, the source of which is connected to the gate of the NMOS transistor 508, the bulk of which is connected to the ground; the NMOS transistor 510, the drain of which is connected to the input terminal 502, the gate of which is connected to the output terminal 518 of the rectifier, the source of which is connected to the gate of the NMOS transistor 507, the bulk of which is connected to the ground; the NMOS transistor 511, the source of which is connected to the input terminal 501, the gate of which is connected to the output terminal 518 of the rectifier, the drain of which is connected to the source of the NMOS transistor 507, the bulk of which is connected to the ground; the NMOS transistor 512, the source of which is connected to the input terminal 502, the gate of which is connected to the output terminal 518 of the rectifier, the drain of which is connected to the source of the NMOS transistor 508, the bulk of which is connected to the ground; a loading resistor 517, one end of which is connected to the output terminal 518 of the rectifier, the other is connected to the ground.

In the embodiment, when the AC signal input 501 is during positive cycle and the input 502 is during negative cycle, a forward current flows from the input terminal 501 through the drain and the source of the transistor of 505→the output terminal 518 of the rectifier→the resistor 517→the ground→the drain and the source of the transistor 508→the drain and the source of the transistor 512 and back to the input terminal 502, a positive cycle rectified voltage is achieved on the resistor 517, meanwhile, it is because of adding the transistor 509 that the voltage imposed on the gate 516 of the transistor 508 from the input terminal decreases, the voltage between the drain and the source of the transistor 511 divides the voltage imposed by the AC signal between the gate 515 and the source 513 of the transistor 507. And when the AC signal input 501 is during negative cycle and the input 502 is during positive cycle, a forward current flows from the input terminal 502 through the drain and the source of the transistor of 506→the output terminal 518 of the rectifier→the resistor 517→the ground→the drain and the source of the transistor 507→the drain and the source of the transistor 511 and back to the input terminal 501, another positive cycle rectified voltage is achieved on the resistor 517, meanwhile, it is because of adding the transistor 510 that the voltage imposed on the gate 515 of transistor 507 from the input terminal decreases, the voltage between the drain and the source of the transistor 512 divides the voltage imposed by the AC signal between the gate 516 and the source 514 of the transistor 508. Therefore, according to the above description, a positive full-wave rectified voltage waveform is achieved on the loading resistor 315 and is put out from the output terminal 518 of the rectifier.

Figure 10B:
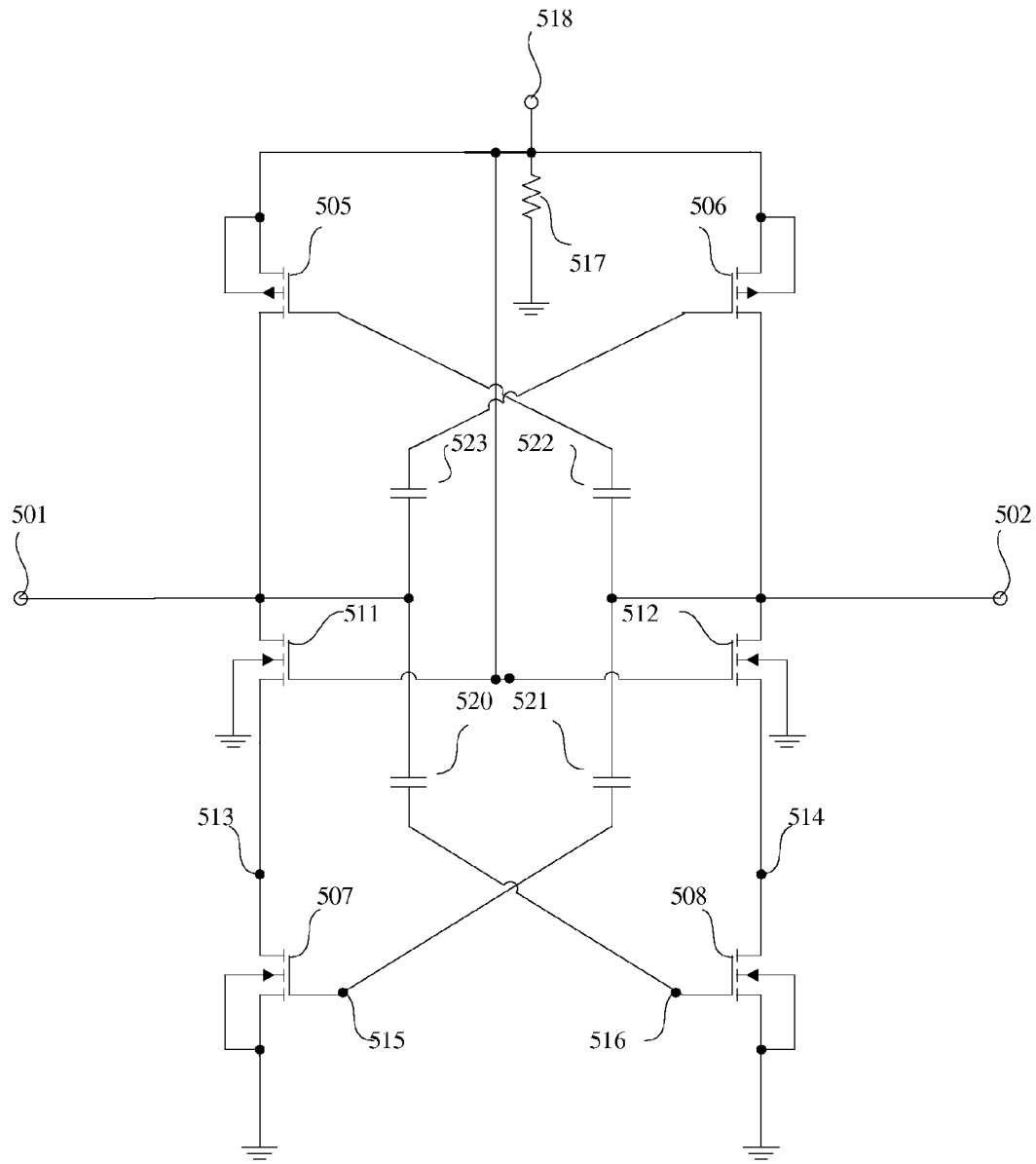
FIG. 10B is a structural diagram of an embodiment of a rectifier implemented with capacitor according to the present invention.

Furthermore, it could achieve the same result using a capacitor 522 as shown in FIG. 10B instead of the NMOS transistor 503 in FIG. 10 A and/or using a capacitor 523 instead of the NMOS transistor 504 in FIG. 10.A, and/or using a capacitor 520 instead of the NMOS transistor 509 in FIG. 10.A, and/or using a capacitor 521 instead of the NMOS transistor 510 in FIG. 10A.

As is shown in FIG. 10B, the rectifier comprising: a capacitor 522, the drain of which is connected to an input terminal 502, the gate of which is connected to an output terminal 518 of the rectifier, the source of which is connected to the gate of a PMOS transistor 505, the bulk of which is connected to the ground; an capacitor 523, the drain of which is connected to an input terminal 501, the gate of which is connected to an output terminal 518 of the rectifier, the source of which is connected to the gate of a PMOS transistor 506, the bulk of which is connected to the ground; a PMOS transistor 505, the source of which is connected to the input terminal 501, the gate of which is connected to the source of the capacitor 522, the drain and the bulk of which are connected with each other and as the output terminal 518 of the rectifier; a PMOS transistor 506, the source of which is connected to the input terminal 502, the gate of which is connected to the source of the capacitor 523, the drain and the bulk of which are connected with each other and as the output terminal 518 of the rectifier; an NMOS transistor 507, the source of which is connected to the drain of an NMOS transistor 511, the gate of which is connected to the source of a capacitor 521, the drain and the bulk of which are connected with each other and then to the ground; an NMOS transistor 508, the source of which is connected to the drain of an NMOS transistor 512, the gate of which is connected to the source of a capacitor 520, the drain and the bulk of which are connected with each other and then to the ground; the capacitor 520, the drain of which is connected to the input terminal 501, the gate of which is connected to the output terminal 518 of the rectifier, the source of which is connected to the gate of the NMOS transistor 508, the bulk of which is connected to the ground; the capacitor 521, the drain of which is connected to the input terminal 502, the gate of which is connected to the output terminal 518 of the rectifier, the source of which is connected to the gate of the NMOS transistor 507, the bulk of which is connected to the ground; the NMOS transistor 511, the source of which is connected to the input terminal 501, the gate of which is connected to the output terminal 518 of the rectifier, the drain of which is connected to the source of the NMOS transistor 507, the bulk of which is connected to the ground; the NMOS transistor 512, the source of which is connected to the input terminal 502, the gate of which is connected to the output terminal 518 of the rectifier, the drain of which is connected to the source of the NMOS transistor 508, the bulk of which is connected to the ground; a loading resistor 517, one end of which is connected to the output terminal 518 of the rectifier, the other is connected to the ground. In the embodiment, when the AC signal input 501 is during positive cycle and the input 502 is during negative cycle, a forward current flows from the input terminal 501 through the drain and the source of the transistor of 505→the output terminal 518 of the rectifier→the resistor 517→the ground→the drain and the source of the transistor 508→the drain and the source of the transistor 512 and back to the input terminal 502, a positive cycle rectified voltage is achieved on the resistor 517, meanwhile, it is because of adding the capacitor 521 that the voltage imposed on the gate 516 of the transistor 508 from the input terminal decreases, the voltage between the drain and the source of the transistor 511 divides the voltage imposed by the AC signal between the gate 515 and the source 513 of the transistor 507. And when the AC signal input 501 is during negative cycle and the input 502 is during positive cycle, a forward current flows from the input terminal 502 through the drain and the source of the transistor of 506→the output terminal 518 of the rectifier→the resistor 517→the ground→the drain and the source of the transistor 507→the drain and the source of the transistor 511 and back to the input terminal 501, another positive cycle rectified voltage is achieved on the resistor 517, meanwhile, it is because of adding the capacitor 520 that the voltage imposed on the gate 515 of transistor 507 from the input terminal decreases, the voltage between the drain and the source of the transistor 512 divides the voltage imposed by the AC signal between the gate 516 and the source 514 of the transistor 508. Therefore, according to the above description, a positive full-wave rectified voltage waveform is achieved on the loading resistor 315 and is put out from the output terminal 518 of the rectifier.

A Sixth Embodiment

Figure 11A:
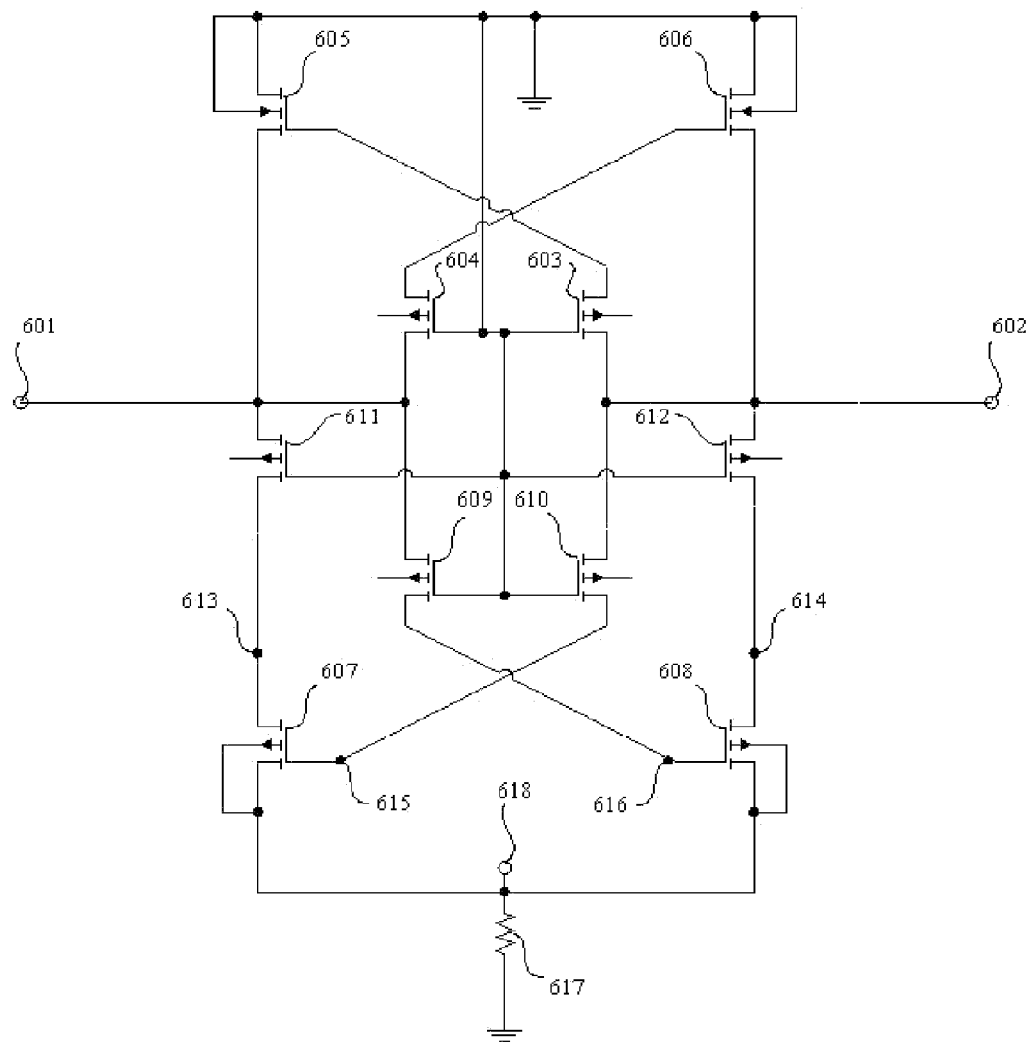
FIG. 11A is a structural diagram of an embodiment of a rectifier implemented with NMOS and PMOS transistor according to the present invention.

As is shown in FIG. 11A, the rectifier comprising: a PMOS transistor 603, the source of which is connected to an input terminal 602, the gate of which is connected to the ground, the drain of which is connected to the gate of an NMOS transistor 605, the bulk of which is connected to an output terminal 618 of the rectifier; a PMOS transistor 604, the drain of which is connected to an input terminal 601, the gate of which is connected to the ground, the drain of which is connected to the gate of an NMOS transistor 606, the bulk of which is connected to the output terminal 618 of the rectifier; the NMOS transistor 605, the source of which is connected to the input terminal 601, the gate of which is connected to the drain of the PMOS transistor 603, the drain and the bulk of which are connected with each other and then to the ground; the NMOS transistor 606, the source of which is connected to the input terminal 602, the gate of which is connected to the drain of the PMOS transistor 604, the drain and the bulk of which are connected with each other and then to the ground; a PMOS transistor 607, the drain of which is connected to the drain of a PMOS transistor 611, the gate of which is connected to the drain of a PMOS transistor 610, the drain and the bulk of which are connected with each other and then as the output terminal 618 of the rectifier; a PMOS transistor 608, the source of which is connected to the drain of a PMOS transistor 612, the gate of which is connected to the drain of a PMOS transistor 609, the drain and the bulk of which are connected with each other and as the output terminal 618 of the rectifier; the PMOS transistor 609, the source of which is connected to the input terminal 601, the gate is connected to the ground, the drain of which is connected to the gate of the PMOS transistor 608, the bulk of which is connected to the output terminal 618 of the rectifier; the PMOS transistor 610, the drain of which is connected to the input terminal 602, the gate of which is connected to the ground, the drain of which is connected to the gate of the PMOS transistor 607, the bulk of which is connected to the output terminal 618 of the rectifier; the PMOS transistor 611, the drain of which is connected to the input terminal 601, the gate of which is connected to the ground, the drain of which is connected to the source of the PMOS transistor 607, the bulk of which is connected to the output terminal 618 of the rectifier; the PMOS transistor 612, the source of which is connected to the input terminal 602, the drain of which is connected to the ground, the drain of which is connected to the source of the PMOS transistor 608, the bulk of which is connected to the output terminal 618 of the rectifier; a loading resistor 617, one end of which is connected to the output terminal 618 of the rectifier, the other is connected to the ground.

In the embodiment, when the AC signal input 601 is during negative cycle and input 602 is during positive cycle, a forward current flows from the input terminal 602 through the drain and the source of the transistor of 612→the drain and the source of the transistor of 608→the output terminal 618 of the rectifier→the resistor 617→the ground→the drain and the source of the transistor 605 and back to the input terminal 601, a positive cycle rectified voltage is achieved on the resistor 617, meanwhile, it is because of adding the transistor 609 that the voltage imposed on the gate 616 of the transistor 608 from the input terminal decreases, the voltage between the drain and the source of the transistor 611 divides the voltage imposed by the AC signal between the gate 615 and the source 613 of the transistor 607, and adding the transistor 603 to decrease the voltage imposed on the gate of transistor 605 from the input terminal. And when the AC signal input 601 is during positive cycle and the input 602 is during negative cycle, a forward current flows from the input terminal 601 through the drain and the source of the transistor of 611→the drain and the source of the transistor of 607→the output terminal 618 of the rectifier→the resistor 617→the ground→the drain and the source of the transistor 606 and back to the input terminal 602, another positive cycle rectified voltage is achieved on the resistor 617, meanwhile, it is because of adding the transistor 610 that the voltage imposed on the gate 615 of the transistor 607 from the input terminal decreases, the voltage between the drain and the source of the transistor 612 divides the voltage imposed by the AC signal between the gate 616 and the source 614 of the transistor 606, and adding the transistor 604 to decrease the voltage imposed on the gate of the transistor 606 from the input terminal. Therefore, according to the above description, a positive full-wave rectified voltage waveform is achieved on the loading resistor 617 and is put out from the output terminal 618 of the rectifier.

Figure 11B:
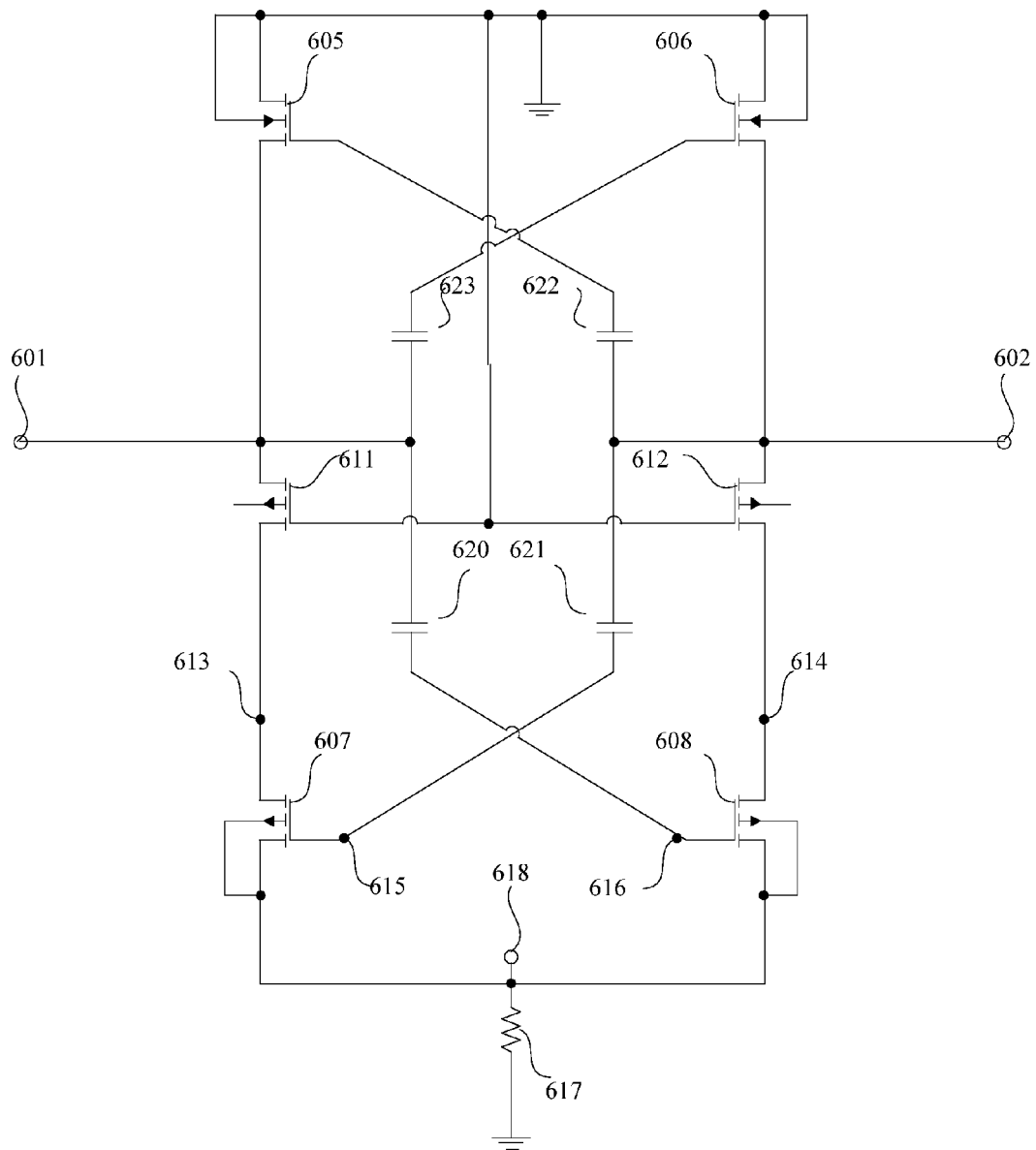
FIG. 11B is a structural diagram of an embodiment of a rectifier implemented with capacitor according to the present invention.

Furthermore, it could achieve the same result using a capacitor 622, as shown in FIG. 11B, instead of the PMOS transistor 603, and/or using a capacitor 623 instead of the PMOS transistor 604, and/or using a capacitor 620 instead of the PMOS transistor 609, and/or using a capacitor 621 instead of the PMOS transistor 610 in FIG. 11A.

As is shown in FIG. 11B, the rectifier comprising: a capacitor 622, the source of which is connected to an input terminal 602, the gate of which is connected to the ground, the drain of which is connected to the gate of an NMOS transistor 605, the bulk of which is connected to an output terminal 618 of the rectifier; a capacitor 623, the drain of which is connected to an input terminal 601, the gate of which is connected to the ground, the drain of which is connected to the gate of an NMOS transistor 606, the bulk of which is connected to the output terminal 618 of the rectifier; the NMOS transistor 605, the source of which is connected to the input terminal 601, the gate of which is connected to the drain of the capacitor 622, the drain and the bulk of which are connected with each other and then to the ground; the NMOS transistor 606, the source of which is connected to the input terminal 602, the gate of which is connected to the drain of the capacitor 623, the drain and the bulk of which are connected with each other and then to the ground; a PMOS transistor 607, the drain of which is connected to the drain of a PMOS transistor 611, the gate of which is connected to the drain of a capacitor 621, the drain and the bulk of which are connected with each other and then as the output terminal 618 of the rectifier; a PMOS transistor 608, the source of which is connected to the drain of a PMOS transistor 612, the gate of which is connected to the drain of a capacitor 620, the drain and the bulk of which are connected with each other and as the output terminal 618 of the rectifier; the capacitor 620, the source of which is connected to the input terminal 601, the gate is connected to the ground, the drain of which is connected to the gate of the PMOS transistor 608, the bulk of which is connected to the output terminal 618 of the rectifier; the capacitor 621, the drain of which is connected to the input terminal 602, the gate of which is connected to the ground, the drain of which is connected to the gate of the PMOS transistor 607, the bulk of which is connected to the output terminal 618 of the rectifier; the PMOS transistor 611, the drain of which is connected to the input terminal 601, the gate of which is connected to the ground, the drain of which is connected to the source of the PMOS transistor 607, the bulk of which is connected to the output terminal 618 of the rectifier; the PMOS transistor 612, the source of which is connected to the input terminal 602, the drain of which is connected to the ground, the drain of which is connected to the source of the PMOS transistor 608, the bulk of which is connected to the output terminal 618 of the rectifier; a loading resistor 617, one end of which is connected to the output terminal 618 of the rectifier, the other is connected to the ground.

In the embodiment, when the AC signal input 601 is during negative cycle and input 602 is during positive cycle, a forward current flows from the input terminal 602 through the drain and the source of the transistor of 612→the drain and the source of the transistor of 608→the output terminal 618 of the rectifier→the resistor 617→the ground→the drain and the source of the transistor 605 and back to the input terminal 601, a positive cycle rectified voltage is achieved on the resistor 617, meanwhile, it is because of adding the capacitor 620 that the voltage imposed on the gate 616 of the transistor 608 from the input terminal decreases, the voltage between the drain and the source of the transistor 611 divides the voltage imposed by the AC signal between the gate 615 and the source 613 of the transistor 607, and adding the capacitor 622 to decrease the voltage imposed on the gate of transistor 605 from the input terminal. And when the AC signal input 601 is during positive cycle and the input 602 is during negative cycle, a forward current flows from the input terminal 601 through the drain and the source of the transistor of 611→the drain and the source of the transistor of 607→the output terminal 618 of the rectifier→the resistor 617→the ground→the drain and the source of the transistor 606 and back to the input terminal 602, another positive cycle rectified voltage is achieved on the resistor 617, meanwhile, it is because of adding the capacitor 621 that the voltage imposed on the gate 615 of the transistor 607 from the input terminal decreases, the voltage between the drain and the source of the transistor 612 divides the voltage imposed by the AC signal between the gate 616 and the source 614 of the transistor 606, and adding the capacitor 623 to decrease the voltage imposed on the gate of the transistor 606 from the input terminal. Therefore, according to the above description, a positive full-wave rectified voltage waveform is achieved on the loading resistor 617 and is put out from the output terminal 618 of the rectifier.

Figure 12:
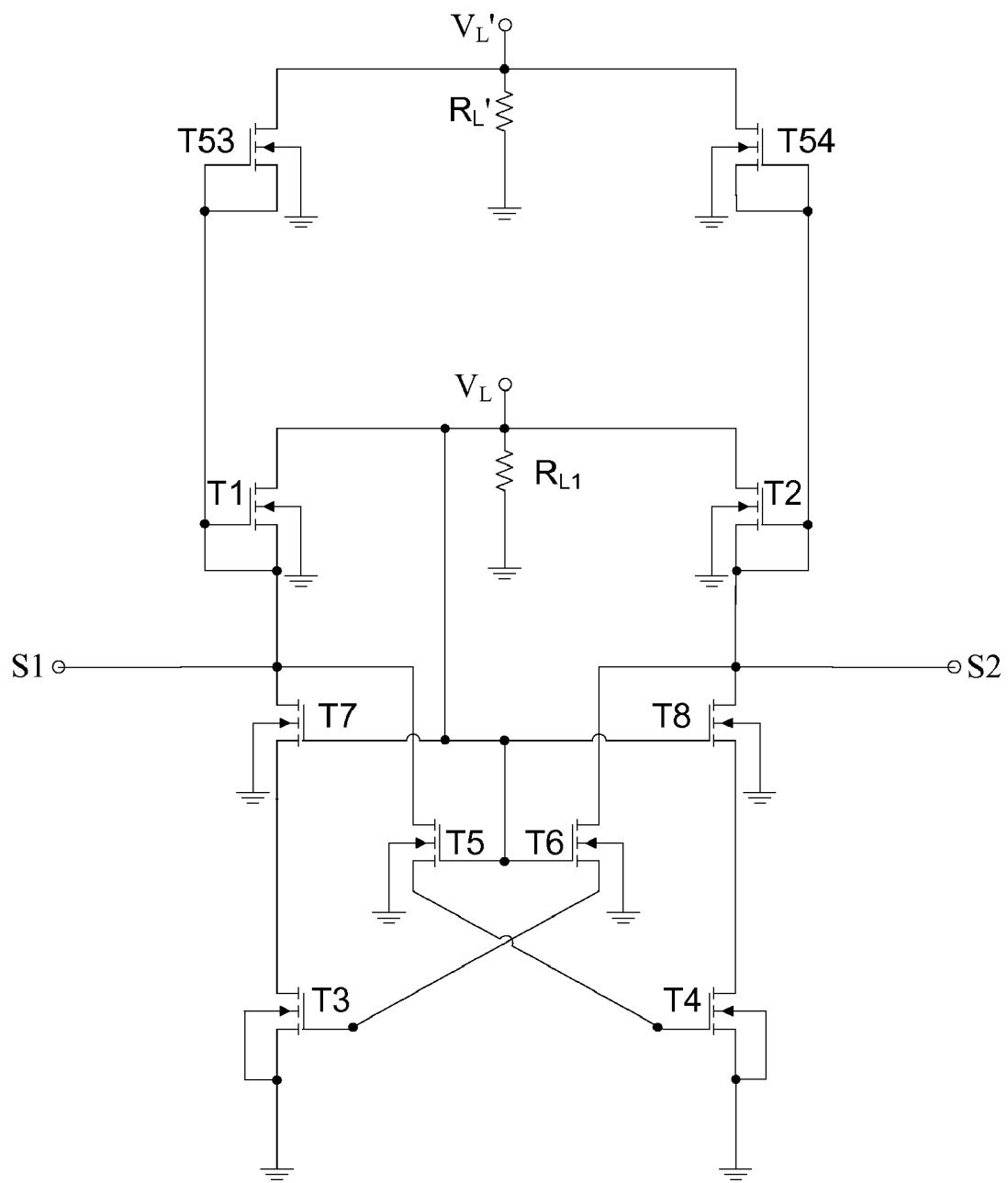
FIG. 12 is a structural diagram of an embodiment of a rectifier with multiple outputs according to the present invention.
Figure 13:
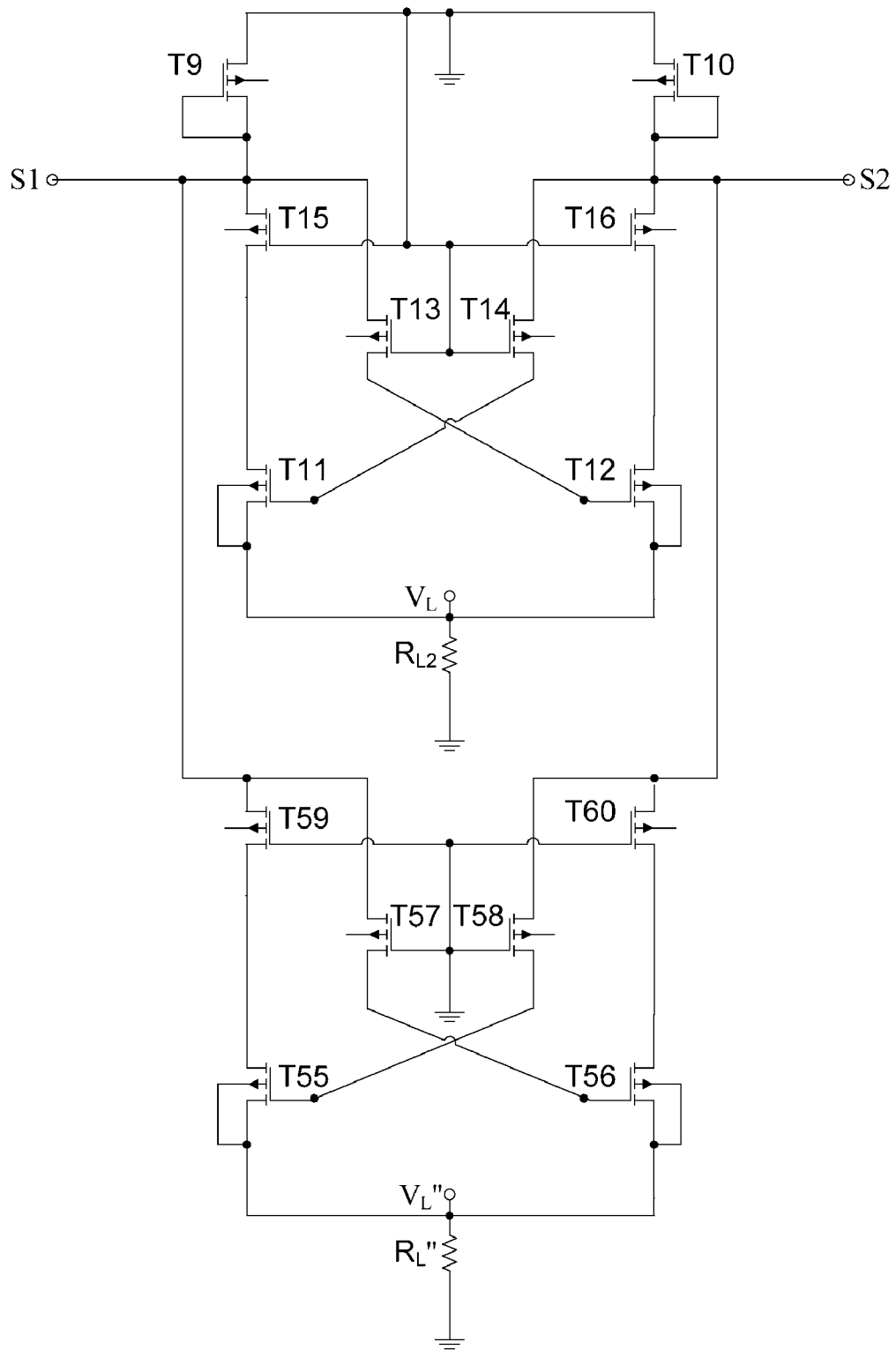
FIG. 13 is a structural diagram of an embodiment of a rectifier with multiple outputs according to the present invention.

As is shown in FIG. 12 and FIG. 13, in which two examples with multiple outputs are given. In the two diagrams, the rectifiers have two outputs.

In present invention, the definition of drain and source of a transistor is: assume it is the input terminal during positive cycle, the output terminal, the ground, the input terminal during negative cycle from high to low in electric potential turn, it is the terminal with high electric potential terminal as the drain and the terminal with low electric potential as the source to an NMOS transistor; it is the terminal with high electric potential terminal as the source and the terminal with low electric potential as the drain to an NMOS transistor.

The said rectifier in the present invention could be applied to RFID electronic tag or smart card chips, the implementing method makes it possible to implement a rectifier of a RFID electronic tag or smart card chip in standard logic CMOS process, and is convenient to integrating a nonvolatile memory based on standard logic CMOS process into the said RFID electronic tag or smart card chips, and overcomes the deficiency of high manufacture and process costs of the RFID electronic tag or smart card implemented with EEPROM technology. Furthermore, the said high-voltage-resistant rectifier in the present invention is not limited to the application of the said RFID electronic tag or smart card chips, it could also be applied into other equipments or devices to decrease costs.

The contents in the present invention are applicable and could attain the said good result. The foregoing detailed description of several embodiments of the present invention didn't attempt to exhaust or limitedly introduce precise form, so the present invention is not in any way restricted to the embodiments described above. For example, the disclosed rectifier is implemented with PMOS, NMOS and PMOS-NMOS transistors. It is all possible to implement a rectifier with all kind of MOS transistor in present invention when giving an exemplification-oriented description of a special embodiment of the rectifier implemented with MOS transistor, comprising positive output rectifier and negative output rectifier. The same as it, the principle of the present invention is also applicable to other circuits besides the said rectifier.

The invention claimed is:

1. A high-voltage-resistant rectifier implemented with standard CMOS transistors, comprising from a first MOS transistor, a second MOS transistor, a third MOS transistor and a fourth MOS transistor as base structure, characterized in that includes:

in the said bridge full-wave rectifier, a sixth MOS transistor or a first capacitor is connected in series between the gate of a third MOS transistor which endures high voltage and a second input terminal of the rectifier to decrease the voltage imposed on the gate of the said third MOS transistor; a seventh MOS transistor is connected in series between the source of the said third MOS transistor and a first input terminal of the said rectifier, and the voltage between the source and the drain of the said seventh transistor is used to divide the voltage imposed by positive and negative AC input signal between the gate and the source of the said third transistor;

in the said bridge full-wave rectifier, a fifth MOS transistor or a second capacitor is connected in series between the gate of a fourth MOS transistor which endures high voltage and the first input terminal of the rectifier to decrease the voltage imposed on the gate of the said fourth MOS transistor; an eighth MOS transistor is connected in series between the source of the said fourth MOS transistor and the second input terminal of the said rectifier, and the voltage between the source and the drain of the said eighth MOS transistor is used to divide the voltage imposed by positive and negative AC input signal between the gate and the source of the said fourth transistor; and when the first and the second MOS transistors in the said bridge full-wave rectifier need to endure high voltage, a ninth MOS transistor or a third capacitor is connected in series between the gate of the first MOS transistor and the second input terminal of the rectifier to decrease the voltage imposed on the gate of the said first MOS transistor; and a tenth MOS transistor or a fourth MOS capacitor is connected in series between the gate of the second MOS transistor and the first input terminal of the rectifier to decrease the voltage imposed on the gate of the said second MOS transistor.

2. The high-voltage-resistant rectifier implemented with standard CMOS transistors according to claim 1, characterized in that includes: multiple outputs are applicable to the said high-voltage-resistant rectifier.

3. The high-voltage-resistant rectifier implemented with standard CMOS transistors according to claim 1, characterized in that includes: it is PMOS transistor or NMOS transistor from the said first transistor to the said tenth transistor.

4. A high-voltage-resistant rectifier with standard CMOS transistors, characterized in that includes:

a first NMOS transistor (103), the gate and the drain of which are connected with each other and then to a first input terminal (101), the source of which is connected to the source of a second NMOS transistor (104) as an output terminal (116) of the rectifier, the bulk of which is connected to the ground;

the second NMOS transistor (104), the gate and the drain of which are connected with each other and then to a second input terminal (102), the source of which is connected to the source of the first NMOS transistor (103) as the output terminal (116) of the rectifier, the bulk of which is connected to the ground;

a third NMOS transistor (105), the source of which is connected to the drain of an seventh NMOS transistor (109), the gate of which is connected to the source of a sixth NMOS transistor (108), the drain and the bulk of which are connected with each other and then to the ground;

a fourth NMOS transistor (106), the source of which is connected to the drain of an eighth NMOS transistor (110), the gate of which is connected to the source of a fifth NMOS transistor (107), the drain and the bulk of which are connected with each other and then to the ground;

the fifth NMOS transistor (107) or a second capacitor (120): when as the fifth NMOS transistor (107), the drain of which is connected to the first input (101), the gate of which is connected to the output terminal (116) of the rectifier, the source of which is connected to the gate of the fourth NMOS transistor (106), the bulk of which is connected to the ground; when as the second capacitor (120), one end of which is connected to the first input (101), the other is connected to the gate of the fourth NMOS transistor (106);

the sixth NMOS transistor (108) or first capacitor (121): when as the sixth NMOS transistor (108), the drain of which is connected to the second input terminal (102), the gate of which is connected to the output terminal (116) of the rectifier, the source of which is connected to the gate of the third NMOS transistor (105), the bulk of which is connected to the ground; when as the first capacitor (121), one end of which is connected to the second terminal (102), the other is connected to the gate of the third NMOS transistor (105);

the seventh NMOS transistor (109), the source of which is connected to the first input terminal (101), the gate of which is connected to the output terminal (116) of the rectifier, the drain of which is connected to the source of the third NMOS transistor (105), the bulk of which is connected to the ground;

the eighth NMOS transistor (110), the source of which is connected to the second input terminal (102), the gate of which is connected to the output terminal (116) of the rectifier, the drain of which is connected to the source of the fourth NMOS transistor, the bulk of which is connected to the ground;

a loading resistor (115), one end of which is connected to the output terminal (116) of the rectifier, the other is connected to the ground.

5. A high-voltage-resistant rectifier with standard CMOS transistors, characterized in that includes:

a first PMOS transistor (203), the gate and the drain of which are connected with each other and then to a first input terminal (201), the source of which is connected to the ground, the bulk of which is connected to an output terminal (216);

a second PMOS transistor (204), the gate and the drain of which are connected to a second input (202), the source of which is connected to the ground, the bulk of which is connected to the output terminal (216);

a third PMOS transistor (205), the source of which is connected to the drain of a seventh PMOS transistor (209), the source of which is connected to the drain of a sixth PMOS transistor (208), the drain and the bulk of which are connected with each other and as the output terminal (216);

a fourth PMOS transistor (206), the source of which is connected to the drain of an eighth PMOS transistor (210), the gate of which is connected to the drain of a fifth PMOS transistor (207), the drain and the bulk of which are connected with each other and as the output terminal (216);

the fifth PMOS transistor (207) or a second capacitor (220): when as the fifth PMOS transistor (207) the drain of which is connected to the first input terminal (201) the gate of which is connected to the ground, the drain of which is connected to the gate of the fourth PMOS transistor (206), the bulk of which is connected to the output terminal (216); when as the second capacitor, one end of which is connected to the first input terminal (201), the other is connected to the gate of the fourth PMOS transistor (206);

the sixth PMOS transistor (208) or a first capacitor (221): when as the sixth PMOS transistor (208), the source of which is connected to the input terminal (202), the gate of which is connected to the ground, the drain of which is connected to the gate of the third PMOS transistor (205), the bulk of which is connected to the output terminal (216); when as the first capacitor (221), one end of which is connected to the second input terminal (202), the other is connected to the gate of third PMOS transistor (205);

the seventh PMOS transistor (209), the source of which is connected to the first input terminal (201), the source of which is connected to the ground, the drain of which is connected to the source of the third PMOS transistor (205), the bulk of which is connected to the output terminal (216);

the eighth PMOS transistor (210), the source of which is connected to the second input terminal (202), the gate of which is connected to the ground, the drain of which is connected to the source of the fourth PMOS transistor (206), the bulk of which is connected to the output terminal (216);

a load resistor (215), one end of which is connected to the output terminal, the other is connected to the ground.

6. A high-voltage-resistant rectifier with standard CMOS transistors, characterized in that includes:

a first PMOS transistor (303), the source of which is connected to a first input terminal (301), the gate, the drain and the bulk of which are connected with each other and then to the gate, the drain and the bulk of a second PMOS transistor (304) as an output terminal (316) of the rectifier;

the PMOS transistor (304), the source of which is connected to a second input terminal (302), the gate, the drain, the bulk are connected with each other and then to the gate, the drain, the bulk of the first PMOS transistor (303), as the output terminal (316) of the rectifier;

a third NMOS transistor (305), the source of which is connected to the drain of a seventh NMOS transistor (309), the gate of which is connected to the source of a sixth NMOS transistor (308), the drain and the bulk of which are connected with each other and then to the ground;

a fourth NMOS transistor (306), the source of which is connected to the drain of an eighth NMOS transistor (310), the gate of which is connected to the source of a fifth NMOS transistor (307), the drain and the bulk of which are connected with each other and then to the ground;

the fifth NMOS transistor (307) or a second capacitor (320): when as the fifth NMOS transistor (307), the drain of which is connected to the input terminal (301), the gate of which is connected to the output terminal (316) of the rectifier, the source of which is connected to the gate of the fourth NMOS transistor (306), the bulk of which is connected to the ground; when as the second capacitor (320), one end of which is connected to the first input terminal (301), the other is connected to the gate of the fourth NMOS transistor (306);

the sixth NMOS transistor (308) or a first capacitor (321): when as the sixth NMOS transistor (308) the drain of which is connected to the second input terminal (302), the gate of which is connected to output terminal (316)

of the rectifier, the source of which is connected to the gate of the third NMOS transistor (305), the bulk of which is connected to the ground; when as the first capacitor (321), one end of which is connected to the second input terminal (302), the other is connected to the gate of the third NMOS transistor (305);

the seventh NMOS transistor (309), the source of which is connected to the first input terminal (301), the gate of which is connected to the output terminal (316) of the rectifier, the drain of which is connected to the source of the third NMOS transistor (305), the bulk of which is connected to the ground;

the eighth NMOS transistor (310), the source of which is connected to the second input terminal (302), the gate is connected to the output terminal (316) of the rectifier, the drain of which is connected to the source of the fourth NMOS transistor (306), the bulk of which is connected to the ground;

a loading resistor (315), one end of which is connected to the output terminal (316) of the rectifier, the other is connected to the ground.

7. A high-voltage-resistant rectifier with standard CMOS transistors, characterized in that includes:

a first NMOS transistor (403), the source of which is connected to a first input terminal (401), the gate, the drain and the bulk of which are connected with each other and then to the ground;

a second NMOS transistor (404), the source of which is connected to a second input terminal (402), the gate, the drain and the bulk of which are connected with each other and then to the ground;

a third PMOS transistor (405), the source of which is connected to the drain of a seventh PMOS transistor (409), the gate of which is connected to the drain of a sixth PMOS transistor (408), the drain and the bulk of which are connected with each other and as an output terminal (416) of the rectifier;

a fourth PMOS transistor (406), the source of which is connected to the drain of an eighth PMOS transistor (410), the gate of which is connected to the drain of a fifth PMOS transistor (407), the drain and the bulk of which are connected with each other and as the output terminal (416) of the rectifier;

the fifth PMOS transistor (407) or a second capacitor (420): when as the fifth PMOS transistor (407), the source of which is connected to the first input terminal (401), the gate of which is connected to the ground, the drain of which is connected to the gate of the fourth PMOS transistor (406), the bulk of which is connected to the output terminal (416) of the rectifier; when as the second capacitor (420), one end of which is connected to the first input terminal (401), the other is connected to the gate of the fourth PMOS transistor (406);

theسسsixth PMOS transistor (408) or the first capacitor (421): when as the sixth PMOS transistor (408), the source of which is connected to the second input terminal (402), the gate of which is connected to the ground, the drain of which is connected to the gate of the third PMOS transistor (405), the bulk of which is connected to the output terminal (416) of the rectifier; when as the first capacitor (421), one end of which is connected to the second input terminal (402), the other is connected the gate of the third PMOS transistor (405);

the seventh PMOS transistor (409), the source of which is connected to the first input terminal (401), the gate is connected to the ground, the drain of which is connected to the source of the third PMOS transistor (405), the bulk is connected to the output terminal (416) of the rectifier;

the eighth PMOS transistor (410), the source of which is connected to the second input terminal (402), the gate of which is connected to the ground, the drain of which is connected to the source of the fourth PMOS transistor (406), the bulk of which is connected to the output terminal (416) of the rectifier;

a loading resistor (415), one end of which is connected to the output terminal (416) of the rectifier, the other is connected to the ground.

8. A high-voltage-resistant rectifier with standard CMOS transistors, characterized in that includes:

a first PMOS transistor (505), the source of which is connected to the first input terminal (501), the gate of which is connected to the source of a ninth NMOS transistor (503), the drain and the bulk of which are connected with each other and as the output terminal (518) of the rectifier;

a second PMOS transistor (506), the source of which is connected to the second input terminal (502), the gate of which is connected to the source of an tenth NMOS transistor (504), the drain and the bulk of which are connected with each other and as the output terminal (518) of the rectifier;

a third NMOS transistor (507), the source of which is connected to the drain of a seventh NMOS transistor (511), the gate of which is connected to the source of a sixth NMOS transistor (510), the drain and the bulk of which are connected with each other and then to the ground;

a fourth NMOS transistor (508), the source of which is connected to the drain of an eighth NMOS transistor (512), the gate of which is connected to the source of a fifth NMOS transistor (509), the drain and the bulk of which are connected with each other and then to the ground;

the fifth NMOS transistor (509) or a second capacitor (520): when as the fifth NMOS transistor (509), the drain of which is connected to the first input terminal (501), the gate of which is connected to the output terminal (518) of the rectifier, the source of which is connected to the gate of the fourth NMOS transistor (508), the bulk of which is connected to the ground; when as the second capacitor (520), one end of which is connected to the first input terminal (501), the other is connected to the gate of the fourth PMOS transistor (508);

the sixth NMOS transistor (510) or a first capacitor (521): when as the sixth NMOS transistor (510), the drain of which is connected to the second input terminal (502), the gate of which is connected to the output terminal (518) of the rectifier, the source of which is connected to the gate of the third NMOS transistor (507), the bulk of which is connected to the ground; when as the first capacitor (521), one end of which is connected to the second input terminal (502), the other is connected to the gate of the third PMOS transistor (507);

the seventh NMOS transistor (511), the source of which is connected to the first input terminal (501), the gate of which is connected to the output terminal (518) of the rectifier, the drain of which is connected to the source of the third NMOS transistor, the bulk of which is connected to the ground;

the eighth NMOS transistor (512), the source of which is connected to the second input terminal (502), the gate of which is connected to the output terminal (518) of the rectifier, the drain of which is connected to the source of the fourth NMOS transistor (508), the bulk of which is connected to the ground;

the ninth NMOS transistor (503) or a third capacitor (522): when as ninth NMOS transistor (503), the drain of which is connected to the second input terminal (502), the gate of which is connected to an output terminal (518) of the rectifier, the source of which is connected to the gate of the first PMOS transistor (505), the bulk of which is connected to the ground; when as the third capacitor (522), one end of which is connected to the second input terminal (502), the other is connected to the gate of the first PMOS transistor (505);

the tenth NMOS transistor (504) or a fourth capacitor (523): when as the tenth NMOS transistor (504), the drain of which is connected to the first input terminal (501), the gate of which is connected to the output terminal (518), of the rectifier the source of which is connected to the gate of the second PMOS transistor (506), the bulk of which is connected to the ground; when as the fourth capacitor (523), one end of which is connected to the first input terminal (501), the other is connected to the gate of the second PMOS transistor (506);

a loading resistor (517), one end of which is connected to the output terminal of the rectifier, the other is connected to the ground.

9. A high-voltage-resistant rectifier with standard CMOS transistors, characterized in that includes:

a first NMOS transistor (605), the source of which is connected to a first input terminal (601), the gate of which is connected to the drain of a ninth PMOS transistor, the drain and the bulk of which are connected with each other and then to the ground;

a second NMOS transistor (606), the source of which is connected to a second input terminal (602), the gate of which is connected to the drain of a tenth PMOS transistor (604), the drain and the bulk of which are connected with each other and then to the ground;

a third PMOS transistor (607), the drain of which is connected to the drain of a seventh PMOS transistor (611), the gate of which is connected to the drain of a sixth PMOS transistor (610), the drain and the bulk of which are connected with each other and then as an output terminal (618) of the rectifier;

a fourth PMOS transistor (608), the source of which is connected to the drain of an eighth PMOS transistor (612), the gate of which is connected to the drain of a fifth PMOS transistor (609), the drain and the bulk of which are connected with each other and as the output terminal (618) of the rectifier;

the fifth PMOS transistor (609) or a second capacitor (620): when as the fifth PMOS transistor (609), the source of which is connected to the first input terminal (601), the gate of which is connected to the ground, the drain of which is connected to the gate of the fourth PMOS transistor (608), the bulk of which is connected to the output terminal (618) of the rectifier; when as the second capacitor (620), one end of which is connected to the first input terminal (601), the other is connected to the gate of the fourth PMOS transistor (608);

the sixth PMOS transistor (610) or a first capacitor (621): when as the sixth PMOS transistor (610), the source of which is connected to the second input terminal (602), the gate of which is connected to the ground, the drain of which is connected to the gate of the third PMOS transistor (607), the bulk of which is connected to the output terminal (618) of the rectifier; when as the first capacitor (621), one end of which is connected to the second input terminal (602), the other is connected to the gate of the third PMOS transistor (607);

the seventh PMOS transistor (611), the source of which is connected to the first input terminal (601), the gate of which is connected to the ground, the drain of which is connected to the source of the third PMOS transistor (607), the bulk of which is connected to the output terminal (618) of the rectifier;

the eighth PMOS transistor (612), the source of which is connected to the second input terminal (602), the gate of which is connected to the ground, the drain of which is connected to the source of the fourth PMOS transistor (608), the bulk of which is connected to the output terminal (618) of the rectifier;

the ninth PMOS transistor (603) or a third capacitor (622): when as ninth PMOS transistor (603), the source of which is connected to the second input terminal (602), the gate of which is connected to the ground, the drain of which is connected to the gate of the first NMOS transistor (605), the bulk of which is connected to an output terminal (618) of the rectifier; when as the third capacitor (622), one end of which is connected to the second input terminal (602), the other is connected to the gate of the first PMOS transistor (605);

the tenth PMOS transistor (604) or a fourth capacitor (623): when as the tenth PMOS transistor (604), the source of which is connected to the first input terminal (601), the gate of which is connected to the ground, the drain of which is connected to the gate of the second NMOS transistor (606), the bulk of which is connected to the output terminal (618) of the rectifier; when as the fourth capacitor (623), one end of which is connected to the first input terminal (601), the other is connected to the gate of the second PMOS transistor (606);

a loading resistor (617), one end of which is connected to the output terminal (618) of the rectifier, the other is connected to the ground.

* * * * *